US012651326B2

(12) United States Patent
Shimizu

(10) Patent No.: US 12,651,326 B2
(45) Date of Patent: Jun. 9, 2026

(54) INFORMATION DISPLAY DEVICE, INFORMATION DISPLAY METHOD, AND NON-TRANSITORY COMPUTER-READABLE STORAGE MEDIUM

(71) Applicant: CITIZEN WATCH CO., LTD., Tokyo (JP)

(72) Inventor: Hideki Shimizu, Hanno (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 376 days.

(21) Appl. No.: 18/258,559

(22) PCT Filed: Dec. 17, 2021

(86) PCT No.: PCT/JP2021/046742
§ 371 (c)(1),
(2) Date: Jun. 21, 2023

(87) PCT Pub. No.: WO2022/138492
PCT Pub. Date: Jun. 30, 2022

(65) Prior Publication Data
US 2024/0095901 A1      Mar. 21, 2024

(30) Foreign Application Priority Data

Dec. 23, 2020    (JP) ................................. 2020-214082

(51) Int. Cl.
*G06K 9/00*        (2022.01)
*G06T 7/00*        (2017.01)
*G06T 7/30*        (2017.01)
(52) U.S. Cl.
CPC .............. *G06T 7/0004* (2013.01); *G06T 7/30* (2017.01); *G06T 2207/20081* (2013.01)

(58) Field of Classification Search
CPC .. G06V 2201/02; G06V 10/255; G04D 7/004; G06T 7/30; G06T 2207/20081; G04G 21/02
See application file for complete search history.

(56) References Cited

U.S. PATENT DOCUMENTS

| | | | |
|---|---|---|---|
| 2013/0170327 A1 | 7/2013 | Peters et al. | |
| 2018/0211122 A1 | 7/2018 | Amico et al. | |
| 2018/0276472 A1 | 9/2018 | Tanaka | |

FOREIGN PATENT DOCUMENTS

| | | | |
|---|---|---|---|
| CN | 107633061 A | * | 1/2018 |
| CN | 109643374 A | | 4/2019 |

(Continued)

OTHER PUBLICATIONS

International Search Report of Mar. 22, 2022, for International Patent Application PCT/JP2021/046742 with English translation, p. 1 to 4.

(Continued)

*Primary Examiner* — Gregory A Morse
*Assistant Examiner* — Kevin M Coomber
(74) *Attorney, Agent, or Firm* — HEA Law PLLC

(57)         ABSTRACT

A user terminal includes an actual image obtaining unit that obtains an actual image in which an electronic timepiece is displayed, a model determining unit that specifying information about the electronic timepiece based on the actual image, an information display unit that displays information about the electronic timepiece. The model determining unit determines whether the actual image is influenced by external light based on the actual image, where the influence of the external light occurs when the actual image is obtained and inhibits identification of the information about the electronic timepiece.

8 Claims, 21 Drawing Sheets

(56)     References Cited

FOREIGN PATENT DOCUMENTS

| JP | 2010062726 A | * | 3/2010 | |
| JP | 2013079961 A | | 5/2013 | |
| JP | 2016147600 A | | 8/2016 | |
| JP | 2018159678 A | | 10/2018 | |
| JP | 6973869 B2 | * | 12/2021 | |
| WO | WO-2018221005 A1 | * | 12/2018 | ............ G01N 21/84 |
| WO | 2020045631 A1 | | 3/2020 | |

OTHER PUBLICATIONS

Office Action of Dec. 2, 2025, for corresponding JP Patent Application No. 2022-571405, pp. 1-4.
Office Action of Sep. 24, 2025, for corresponding JP Patent Application No. 2022-571405, pp. 1-5.

* cited by examiner

REFLECTION IMAGE

IMAGE OF MODEL 2

IMAGE OF MODEL 1

FIG.3

|  | STOP | TIME DEVIATION |
|---|---|---|
| MODEL 1 | p.10 | p.15 |
| MODEL 2 | p.10 | p.15 |
| MODEL 3 | p.8 | p.20 |
| . | . | . |
| . | . | . |
| . | . | . |

20

| |
|---|
| ACTUAL IMAGE OBTAINING UNIT — 31 |
| MODEL DETERMINING UNIT — 32 |
| UNEVENNESS EMPHASIZED IMAGE GENERATING UNIT — 33 |
| OPERATION DETERMINING UNIT — 34 |
| INFORMATION DISPLAY UNIT — 35 |
| NOTIFICATION UNIT — 36 |

Figure 6D:
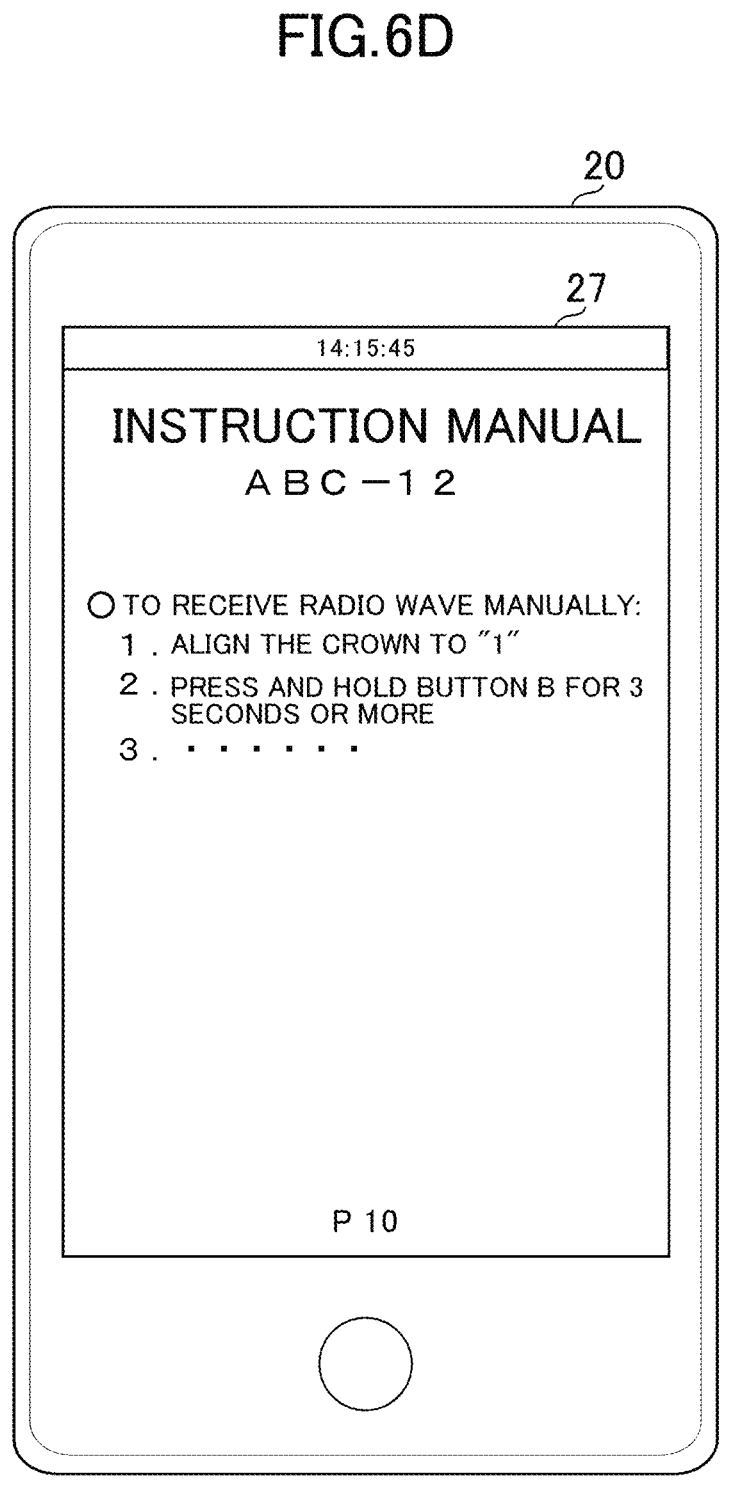

INSTRUCTION MANUAL
A B C − 1 2

○ TO RECEIVE RADIO WAVE MANUALLY:
  1 . ALIGN THE CROWN TO "1"
  2 . PRESS AND HOLD BUTTON B FOR 3
      SECONDS OR MORE
  3 . • • • • • •

Figure 10:
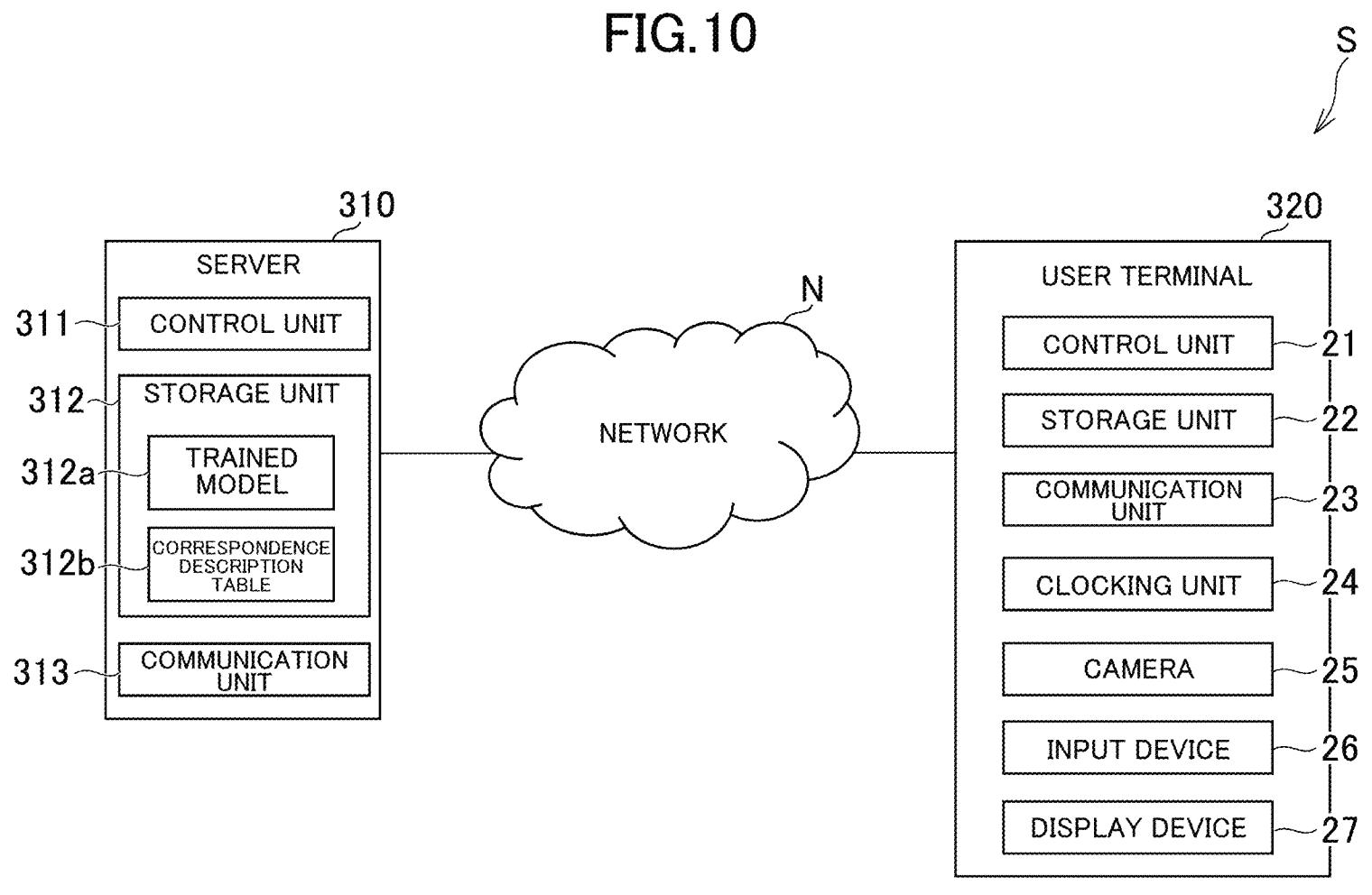

USER TERMINAL — 320

- CONTROL UNIT — 21
- STORAGE UNIT — 22
- COMMUNICATION UNIT — 23
- CLOCKING UNIT — 24
- CAMERA — 25
- INPUT DEVICE — 26
- DISPLAY DEVICE — 27

N

NETWORK

SERVER — 310

- CONTROL UNIT — 311
- STORAGE UNIT — 312
  - TRAINED MODEL — 312a
  - CORRESPONDENCE DESCRIPTION TABLE — 312b
- COMMUNICATION UNIT — 313

320

| | |
|---|---|
| ACTUAL IMAGE OBTAINING UNIT | 331 |
| DEVICE INFORMATION SPECIFYING UNIT | 332 |
| INFORMATION DISPLAY UNIT | 335 |
| NOTIFICATION UNIT | 336 |

520

INFORMATION DISPLAY DEVICE, INFORMATION DISPLAY METHOD, AND NON-TRANSITORY COMPUTER-READABLE STORAGE MEDIUM

CROSS REFERENCE TO RELATED APPLICATIONS

This application is a National Stage of International Application No. PCT/JP2021/046742 filed on Dec. 17, 2021, which claims priority from Japanese Patent Application 2020-214082, filed on Dec. 23, 2020. The contents of the above document are incorporated herein by reference in its entirety.

TECHNICAL FIELD

The present invention relates to an information display device, an information display method, and a non-transitory computer-readable storage medium.

BACKGROUND ART

Patent Literature 1 discloses a technique for recognizing a model of an electronic timepiece using a user terminal, such as a smart phone.

CITATION LIST

Patent Literature

Patent Literature 1: JP2018-159678A

SUMMARY OF INVENTION

Technical Problem

As disclosed in Patent Literature 1, in the technical field of capturing a device such as an electronic timepiece and recognizing predetermined information from the captured image, sometimes the device displayed on the image may not be determined due to the influence of external light. When the result of determination is not output correctly and the cause thereof is not clear, the user simply misunderstands that the device is not a target of determination. As a result, the user cannot obtain information that the user originally should obtain. Further, the device may be determined to be different from the captured device due to the external light.

One or more embodiments of the present invention have been conceived in view of the above, and an object thereof is to improve accuracy of determining information related to a device displayed in an image.

Solution to Problem (1) An information display device includes an actual image obtaining unit that obtains an actual image in which a device indicating predetermined information is displayed by at least either mechanical means or electronic means, a device information specifying unit that specifies information about the device based on the actual image, and an information display unit that displays information about the device, wherein the device information specifying unit determines whether the actual image is influenced by external light based on the actual image, the influence of the external light occurring when the actual image is obtained and inhibiting identification of the information about the device.

(2) In (1), the information display device includes a notification unit that provides a predetermined notification based on a determination result of the device information specifying unit.

(3) In (1) or (2), the influence of the external light that inhibits the identification of the information about the device is light reflected on a surface of the device or halation due to backlight.

(4) In any one of (1) to (3), the device includes a transparent cover that covers a display unit indicating the predetermined information, and the influence of the external light that inhibits the identification of the information about the device is light reflected on a surface of the transparent cover.

(5) In any one of (1) to (4), the device information specifying unit determines a type of the device using a trained model that is trained by learning data including an actual image in which the device captured in advance is displayed.

(6) In (5), the trained model has learned learning data including an actual image of the device that is captured in advance and influenced by the external light that inhibits the identification of the information about the device, and the device information specifying unit uses the trained model to determine whether the device is influenced by the external light that inhibits the identification of the information about the device.

(7) In (5), the trained model has learned learning data including an actual image in which the device in a deteriorated condition and captured in advance is displayed, and the device information specifying unit uses the trained model to determine whether the device is in the deteriorated condition.

(8) In (1), the information display unit displays guidance information about service relating to the device specified by the device information specifying unit.

(9) In any one of (1) to (6), the information display device includes an unevenness emphasized image generating unit generates an unevenness emphasized image representing a color difference corresponding to a difference between a height of a predetermined part of the device in a normal direction of the predetermined part and a height of a part as a comparison target based on the actual image, wherein the device information specifying unit specifies information about the device based on the unevenness emphasized image.

(10) In (1), the device is an installed clock including a display unit that indicates time information and is fixed to a construction or a structure, and the device information specifying unit uses a trained model, which is trained by learning data that includes an actual image of the installed clock captured in advance and is labeled for a location where the installed clock is located and each capturing direction in which the installed clock is captured, to determine the installation location and the capturing direction.

(11) An information display method includes the steps of obtaining an actual image in which a device indicating predetermined information is displayed by at least either mechanical means or electronic means, specifying information about the device based on the actual image, and displaying information about the device, wherein in the step of specifying the information about the device, it is determined whether the actual image is influenced by external light based on the actual image, the external light occurring when the actual image is obtained and inhibiting identification of the information about the device.

(12) A non-transitory computer-readable storage medium causes a computer to execute the steps of obtaining an actual image in which a device indicating predetermined information is displayed by at least either mechanical means or electronic means, specifying information about the device based on the actual image, and displaying information about the device, wherein in the step of specifying the information about the device, it is determined whether the actual image is influenced by external light based on the actual image, the external light occurring when the actual image is obtained and inhibiting identification of the information about the device.

Advantageous Effects of Invention

According to the aspects of (1) to (12) of the present invention, it is possible to improve accuracy of determining information related to a device displayed in an image.

BRIEF DESCRIPTION OF THE DRAWINGS

FIG. 3 is a diagram illustrating an example of a correspondence description table;

FIG. 6D is a diagram illustrating an example of an image displayed on the display device of the user terminal of the first embodiment;

FIG. 10 is a diagram illustrating an overall configuration of an information display device according to the third embodiment;

DESCRIPTION OF EMBODIMENTS

Figure 1:
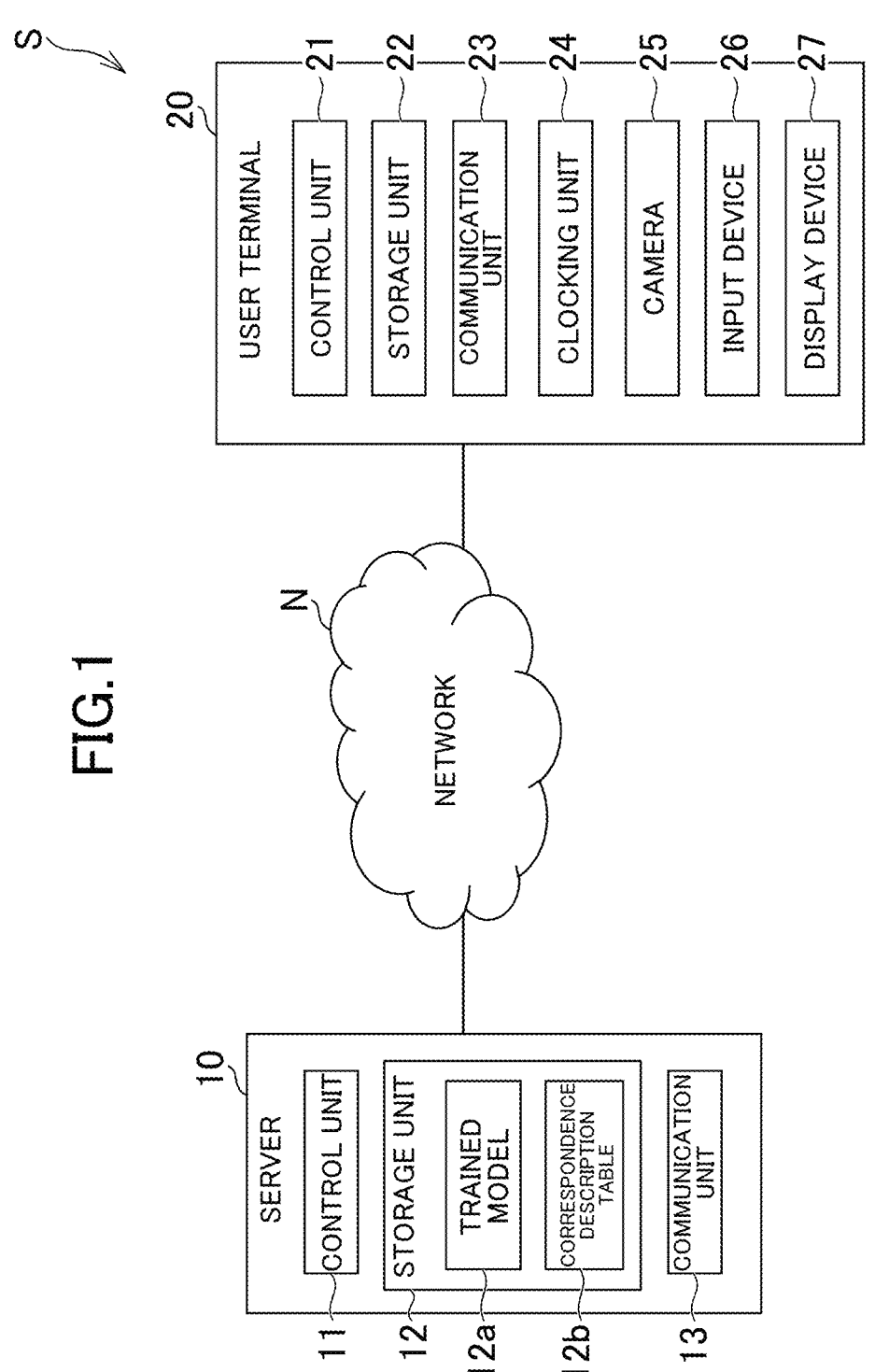
FIG. 1 is a diagram illustrating an overall configuration of an information display system according to the first embodiment.

Embodiments of the present invention will be described below referring to the drawings.

[Information Display System S]

Figure 2:
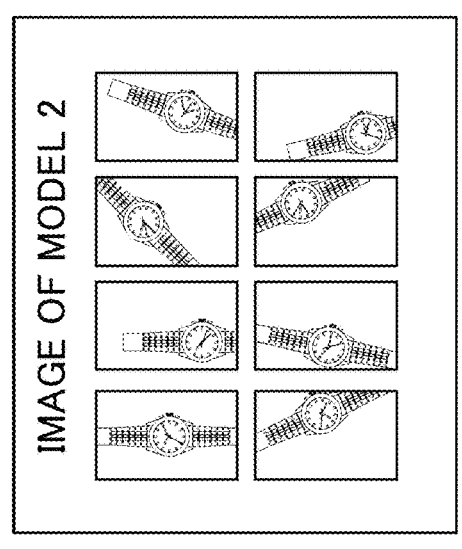
FIG. 2 is a diagram illustrating an example of a supervisory image learned by a trained model.
Figure 2:
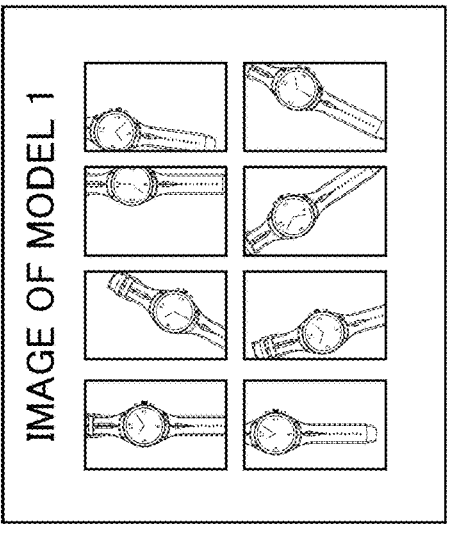

FIG. 1 is a diagram illustrating an overall configuration of an information display device according to the first embodiment. FIG. 2 is a diagram illustrating an example of a supervisory image learned by a trained model. FIG. 3 is a diagram illustrating an example of a correspondence description table.

The information display system S determines a model of an electronic timepiece based on an actual image obtained by capturing the electronic timepiece and displays information on handling of the electronic timepiece according to an operation state of hands of the electronic timepiece in the user terminal 20.

In the first embodiment, an example of an electronic timepiece to be captured will be an analog-type wristwatch including a button and a crown as operation members and exhibiting various functions by operation of the operation members by a user. Assume that the functions of the electronic timepiece to be captured include, for example, a function of adjusting the time by receiving a GPS signal including time information and a function of generating electric power by a built-in solar panel. Further, the electronic timepiece to be captured may be a wristwatch including hands driven on a dial and a transparent cover (also referred to as a windshield) covering the hands.

As shown in FIG. 1, the information display system S includes a server 10 and a user terminal 20 as an information display device, which are connectable to a network N, such as the Internet. In FIG. 1, the number of servers 10 and user terminals 20 are each one, although the number may be two or more.

[Information Display System S: Server 10]

The server 10 is a server computer. The server 10 includes a control unit 11, a storage unit 12, and a communication unit 13.

The control unit 11 includes at least one processor. The control unit 11 executes processing in accordance with programs and data stored in the storage unit 12. The storage unit 12 includes a volatile memory, such as a RAM, and a non-volatile memory, such as a ROM, EEPROM, and a flash memory. In the first embodiment, the storage unit 12 stores at least a trained model 12a and a correspondence description table 12b. The communication unit 13 is a communication interface for wired or wireless communication, and performs data communication via the network N.

The trained model 12a is learning data including an actual image of an electronic timepiece captured in advance, and is generated when machine learning of a supervisory image labeled on each model is performed. The trained model 12a may be trained using a known machine learning algorithm, and may be features that are included in the supervisory images and automatically trained in each layer of the multi-layer neural network, for example.

In the first embodiment, as shown in FIG. 2, the supervisory images include images that display models 1, 2, . . . and are labeled for respective models. The supervisory images include a reflection image. The models 1, 2, . . . are named for convenience in the first embodiment in order to distinguish the types of devices, and in practice, the types of devices may be distinguished by model numbers. The model number indicates an official name of the product, and is represented by a combination of an alphabet and a number, for example.

The supervisory images of the respective models are captured by randomly changing the capturing angle and the time indicated by the hands, for example. FIG. 2 shows an example of a plurality of images of the model 1 having different capturing angles and times indicated by the hands and a plurality of images of the model 2 having different capturing angles and times indicated by the hands.

The reflection image is an image of an electronic timepiece in which something in the vicinity of the electronic timepiece (e.g., a face of a user) is reflected on the surface of the transparent cover covering the hands driven on the dial due to the reflection of external light. In the first embodiment, regardless of the model, the images displaying the electronic timepiece in which the reflection occurs are assigned with the same label and used for the training. FIG. 2 shows an example of the reflection image on which the reflection has occurred on a plurality of models of electronic timepieces.

As shown in FIG. 3, in the correspondence description table 12b, a model of the electronic timepiece and operation state of the hand are associated with a corresponding part (corresponding page) of the instruction manual. In FIG. 3, for example, in the instruction manual of the model 1, page 10 describes information on the handling of the model 1 in a case where the hand is stopped, and page 15 describes information on the handling of the model 1 in a case where the time indicated by the hands is deviated from the time measured by a clocking unit 24 of the user terminal 20.

[Information Display System S: User Terminal 20]

The user terminal 20 is a computer operated by a user. For example, the user terminal 20 is a mobile phone (including a smartphone), a portable information terminal (including a tablet computer and a wearable terminal), and a personal computer. In the first embodiment, a case is described in which the user terminal 20 is a smart phone.

As shown in FIG. 1, the user terminal 20 includes a control unit 21, a storage unit 22, a communication unit 23, a clocking unit 24, a camera 25, an input device 26, and a display device 27. The physical configurations of the control unit 21, the storage unit 22, and the communication unit 23 may be respectively the same as those of the control unit 11, the storage unit 12, and the communication unit 13, and detailed explanation thereof is omitted.

The clocking unit 24 clocks the current time. The current time measured by the clocking unit 24 may be set by a time synchronization technique, such as NITZ (Network Identity and Time Zone). The camera 25 is a device that captures an image of an object. The input device 26 may be a touch panel, for example. The display device 27 includes a display on which information is displayed, and may be, for example, a liquid crystal display or an organic EL display.

Figure 4:
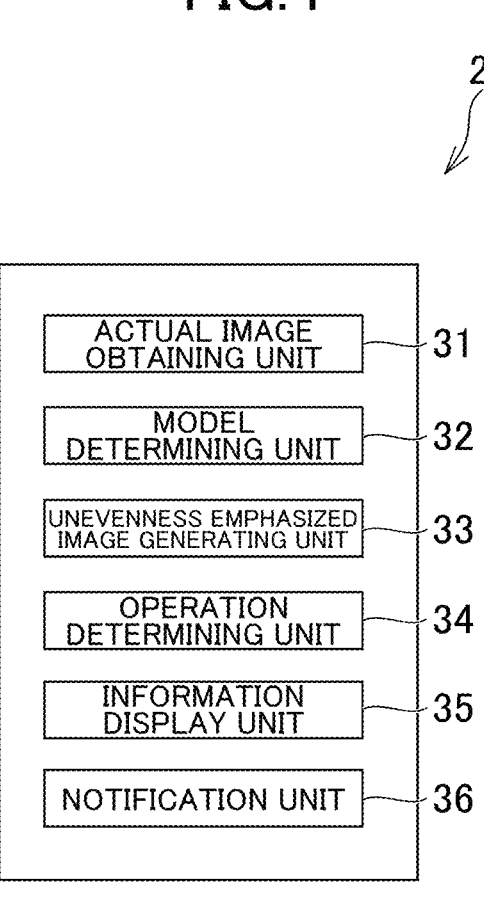
FIG. 4 is a functional block diagram showing an example of functions implemented in a user terminal of the first embodiment.

FIG. 4 is a functional block diagram showing an example of functions implemented in the user terminal of the first embodiment. The user terminal 20 may have a function other than the functions shown in FIG. 4. As shown in FIG. 4, the user terminal 20 includes an actual image obtaining unit 31, a model determining unit (device information specifying unit) 32, an unevenness emphasized image generating unit 33, an operation determining unit 34, an information display unit 35, and a notification unit 36. These units may be mainly implemented by the control unit 21.

The actual image obtaining unit 31 obtains an actual image in which an electronic timepiece indicating time information (device indicating predetermined information) is displayed. The actual image is captured by the camera 25 and displayed on the display device 27 of the user terminal 20, and has not been subjected to special processing. In the first embodiment, the actual image obtaining unit 31 may obtain at least two still images including a first actual image and a second actual image, which is captured after a predetermined period of time has elapsed since the first actual image is captured, as the actual images to be used by the operation determining unit 34 to determine the operation state of the hand. The actual image obtained by the actual image obtaining unit 31 may be a video image including a plurality of consecutive still images.

The model determining unit 32 determines a model of the electronic timepiece using the trained model 12a based on the actual image obtained by the actual image obtaining unit 31. In the first embodiment, the model determining unit 32 may use the technique of deep learning to determine which of the supervisory images trained in advance is closest to a given input image (actual image obtained by the actual image obtaining unit 31 in the first embodiment).

The trained model 12a may be transmitted from the server in response to a request from the user terminal 20 and temporarily stored in the storage unit 22 of the user terminal 20. The model determining unit 32 may use the trained model 12a stored in the storage unit 22 to determine a model of the electronic timepiece.

The unevenness emphasized image generating unit 33 generates an unevenness emphasized image based on the actual image obtained by the actual image obtaining unit 31. The unevenness emphasized image is generated by processing an actual image and represents a color difference corresponding to a difference between the height of the dial and the height of the hand in the normal direction of the dial of the electronic timepiece. Details of the unevenness emphasized image will be described later with reference to FIGS. 7 and 8.

The operation determining unit 34 determines the operation state of the hand of the electronic timepiece as the capturing target based on the unevenness emphasized image generated by the unevenness emphasized image generating unit 33. Specifically, the operation determining unit 34 determines whether the hand of the electronic timepiece is operating normally. More specifically, the operation determining unit 34 determines whether the hand of the electronic timepiece is stopped, and whether the time indicated by the hand of the electronic timepiece is deviated from the current time measured by the clocking unit 24. The hand for the operation determining unit 34 to determine the operation state may be at least a second hand. However, the operation determining unit 34 may determine not only the second hand but also the operation state of the minute hand and the hour hand.

The information display unit 35 refers to the correspondence description table 12b described above, and displays, on the display device 27 of the user terminal 20, information on the handling of the electronic timepiece according to the model of the electronic timepiece as the capturing target and the operation state of the hand of the electronic timepiece.

The notification unit 36 prompts the user to capture the electronic timepiece again by the camera 25 when the model determining unit 32 determines that the electronic timepiece displayed in the image obtained by the actual image obtaining unit 31 is a reflection image, that is, when it is determined that the external light inhibits the identification of the information related to the electronic timepiece when the actual image is obtained. The notification unit 36 may prompt the user to capture the electronic timepiece again by displaying characters prompting the user to do so on the display device 27 of the user terminal 20 or by sound, for example. Further, when the capturing target displayed in the image obtained by the actual image obtaining unit 31 is a model that is not stored in the correspondence description table 12b, the notification unit 36 may notify the user that it is an error.

[Operation of Information Display System S]

Figure 5:
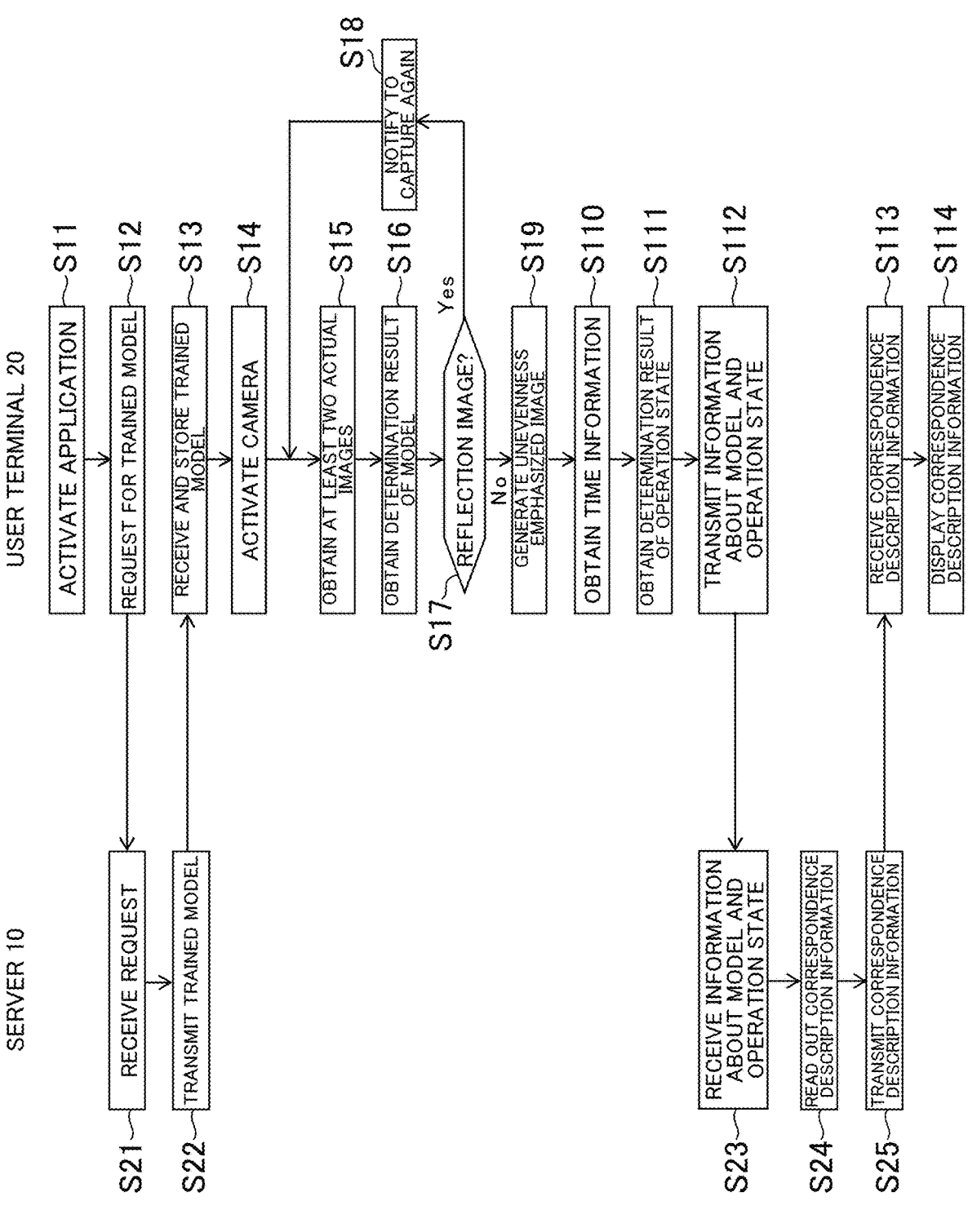
FIG. 5 is a flow chart showing an operation of the information display device according to the first embodiment.
Figure 6A:
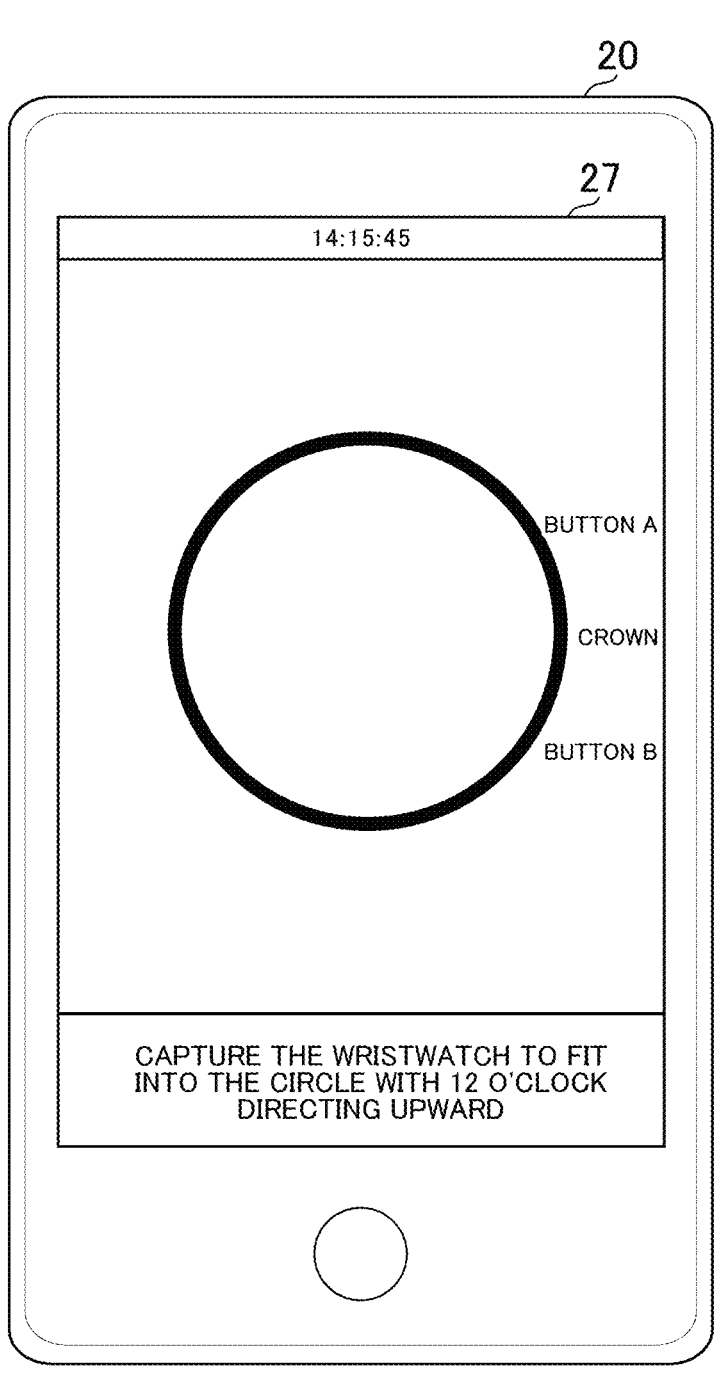
FIG. 6A is a diagram illustrating an example of an image displayed on the display device of the user terminal of the first embodiment.
Figure 6B:
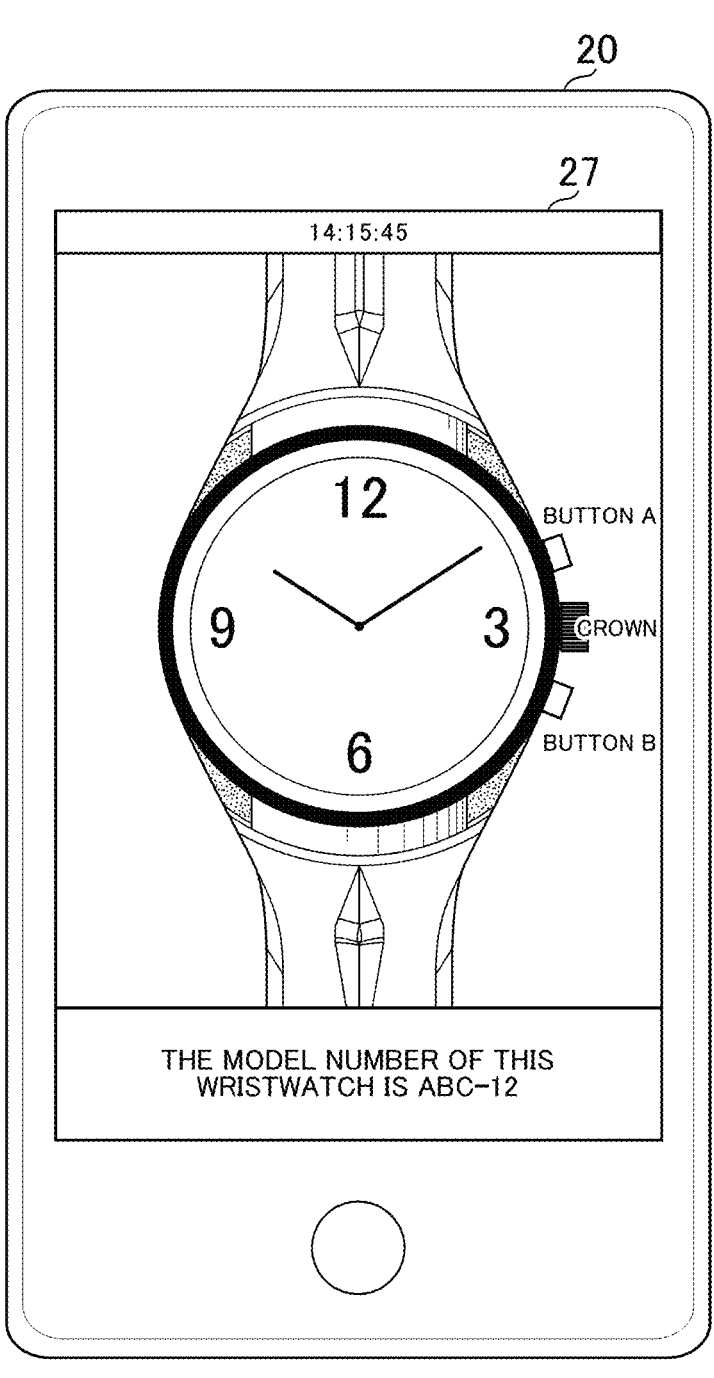
FIG. 6B is a diagram illustrating an example of an image displayed on the display device of the user terminal of the first embodiment.
Figure 6C:
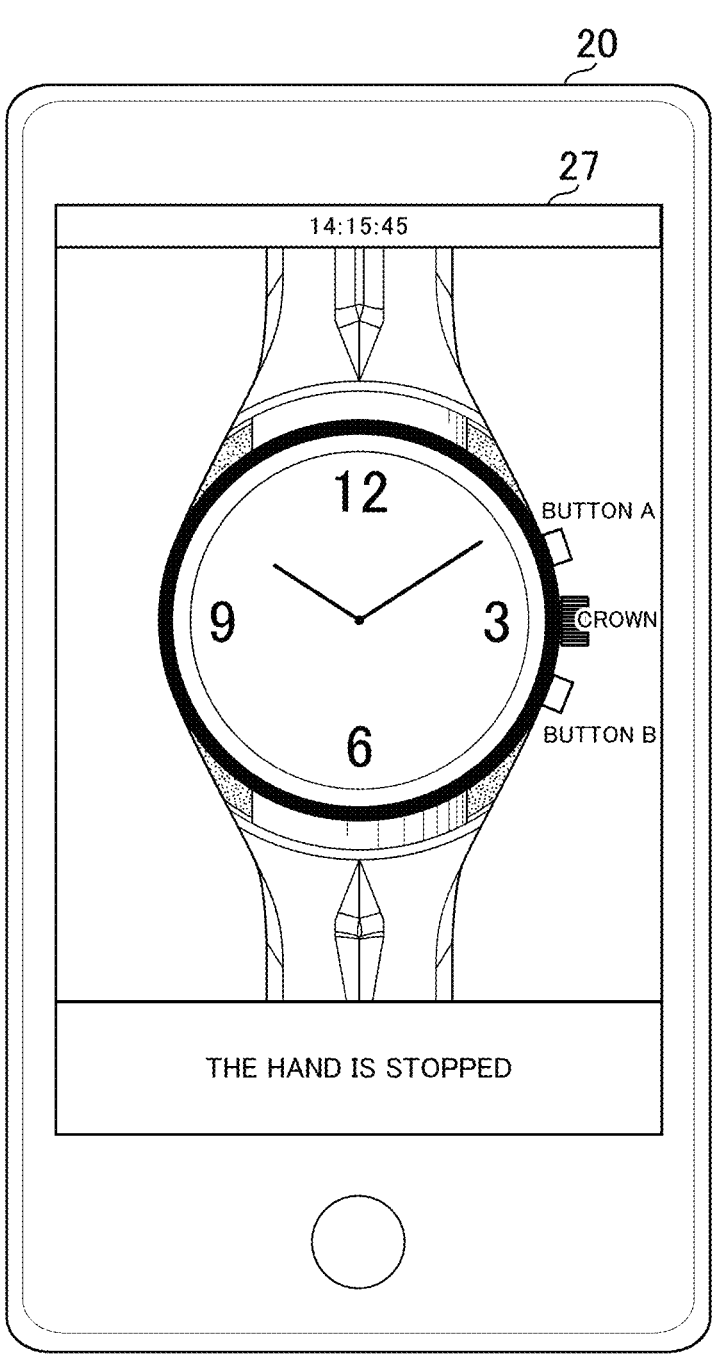
FIG. 6C is a diagram illustrating an example of an image displayed on the display device of the user terminal of the first embodiment.

Referring to FIGS. 5 and 6A to 6D, the operation of the information display system according to the first embodiment will be described. FIG. 5 is a flow chart showing an operation of the information display device according to the first embodiment. FIGS. 6A to 6D are diagrams illustrating examples of images displayed on the display device of the user terminal of the first embodiment. Specifically, FIG. 6A is an example of a screen when the camera is activated, FIG. 6B is an example of a screen indicating a model determination result, FIG. 6C is an example of a screen indicating an operation determination result, and FIG. 6D is an example of a screen indicating a corresponding part of the instruction manual.

The user operates the input device 26 of the user terminal to start an application installed in the user terminal 20 (step S11). After the application starts, the user terminal 20 requests the server 10 for a trained model 12a (step S12). The server 10 receives the request from the user terminal 20 (step S21) and transmits the trained model 12a to the user terminal 20 (step S22).

The user terminal 20 receives the trained model 12a and stores the received trained model 12a in the storage unit 22 (step S13). The user terminal 20 activates the camera 25 (step S14). At this time, as shown in FIG. 6A, an image added with digital information for alignment may be displayed on the screen of the user terminal 20.

FIG. 6A shows an example in which a "circle" that is a shape corresponding to an outer shape of the dial of the electronic timepiece as the capturing target is displayed. Further, FIG. 6A also shows characters indicating the positions of the crown and the buttons together with the "circle." With such an indication on the screen, the user can capture the electronic timepiece with the 12 o'clock position directing upward (upward in FIG. 6A). As shown in FIG. 6A, the screen of the user terminal 20 may display a message on the capturing method to the user.

When the camera 25 of the user terminal 20 is activated and a capturing target is captured, an actual image is obtained by the actual image obtaining unit 31 (step S15).

The actual image obtaining unit 31 may obtain at least two actual images (two frames) that are captured at predetermined intervals.

Subsequently, the model determining unit 32 uses the trained model 12a stored in the storage unit 22 to determine a model of the electronic timepiece displayed in the actual image and obtain the determination result (step S16). FIG. 6B shows an example of a screen where the determination result of the model number is "ABC-12."

If it is determined that the image is a reflection image (Yes in step S17), the notification unit 36 prompts the user to capture the image again by the camera 25 (step S18). That is, the user is prompted to obtain the actual image again by the actual image obtaining unit 31. If any one of the actual images obtained by the actual image obtaining unit 31 is a reflection image, the model determining unit 32 may determine that the image is a reflection image.

If it is determined that the image is not a reflection image (No in step S17), the unevenness emphasized image generating unit 33 generates an unevenness emphasized image based on the actual image (step S19). At least two unevenness emphasized images are preferably generated based on actual images captured at predetermined time intervals. The predetermined time may be one second or more and may be 59 seconds or less. This is because, if two actual images are taken within one second, it may be determined that the hand is stopped when moving normally. When the second actual image is captured exactly 60 seconds after the first actual image is captured, it is determined that the second hand is at the same position and the hand is stopped when moving normally.

The operation determining unit 34 obtains time information related to the current time measured by the clocking unit 24 (S110). The operation determining unit 34 then determines the operation state of the hand of the electronic timepiece based on the time information related to the current time and the unevenness emphasized image, and obtains the determination result (step S111). In FIGS. 6A to 6D, the current time measured by the clocking unit 24 is displayed on the screen of the user terminal 20. Specifically, it is shown that the current time is 14:15:45.

Specifically, the operation determining unit 34 compares the time indicated by the hand displayed in at least one unevenness emphasized image with the current time measured by the clocking unit 24, and if these times do not match, obtains a determination result of "time deviation". Further, the operation determining unit 34 compares at least two unevenness emphasized images, and if the positions of the hands displayed in the unevenness emphasized images match, the operation determining unit 34 determines that the hand is stopped. FIG. 6C shows an example of a screen when the operation determining unit 34 determines that the hand is stopped.

The operation determining unit 34 compares the time indicated by the hand displayed in at least two unevenness emphasized images with the current time measured by the clocking unit 24, and if these times match, obtains a determination result of "normal hand operation."

The user terminal 20 transmits information on the model and the operation state to the server 10 (step S112). The server receives the information on the model and the operation state (step S23), and refers to the correspondence description table 12b stored in the storage unit 12 to read the information on the handling of the device according to the model and the operation state (hereinafter, correspondence description information) (step S24). Subsequently, the server 10 transmits the read correspondence description information to the user terminal 20 (step S25).

The user terminal 20 receives the correspondence description information (step S113). The information display unit 35 displays the correspondence description information on the display device 27 of the user terminal 20 (step S114). FIG. 6D shows a part of the instruction manual relating to the operation of the electronic timepiece of the model number "ABC-12" in a case where the hand is stopped. More specifically, a page of the instruction manual of the model number "ABC-12" indicates an example of the operation that the user needs to perform when the time is adjusted by receiving radio wave. The screen shown in FIG. 6C may be switched to the screen shown in FIG. 6D automatically or by the user operating the input device 26. For example, after the screen shown in FIG. 6C is displayed, a link to the instruction manual may be displayed on the display device 27, and when the user operates the input device 26 to access the link, the screen may be switched to the screen shown in FIG. 6*d*.

There may be several factors that stop the hand of the electronic timepiece or cause the times indicated by the hands to deviate. Examples of factors of the stop include a decrease in the power supply voltage and a malfunction of the microcomputer included in the electronic timepiece. Further, examples of factors of the time deviation include wear of the mechanism, influence of magnetism, and intrusion of dust. When there are some possible factors, the information display unit 35 may preferentially display correspondence description information regarding the factor that is most likely to be a factor of stop or time deviation. If the problem is not resolved, the information display unit 35 may indicate correspondence description information about the next most likely factor. The information on the possibility of the factors of stop or time deviation may be stored in the user terminal 20 in advance based on the examples in the past.

The correspondence description information may include text data and, as shown in FIG. 6D, may be displayed as text on the display device 27. The display unit 35 displays a portion of the textual data corresponding to the operation state of the hand. In this regard, "displays a portion" may be displaying a corresponding page in the instruction manual, or displaying only a corresponding portion of the corresponding page. The correspondence description information may not be limited to the text data, and may be a video image or an animation dynamically describing the handling of the device, for example.

If the operation determining unit 34 obtains a result of "the hand is stopped", a portion of the instruction manual describing the power generation method may be displayed in a case where the electronic timepiece is a solar panel built-in type, and a portion of the instruction manual for describing the battery replacement method may be displayed in a case where the electronic timepiece is not a solar panel built-in type.

If the operation determining unit 34 obtains a result of "time deviation", a portion of the instruction manual describing a method of forcibly receiving a signal including time information may be displayed in a case where the electronic timepiece is a radio-controlled watch, and a portion of the instruction manual for describing a method of adjusting the position of the hand corresponding to the model may be displayed in a case where the electronic timepiece is not a radio-controlled watch.

If the operation determining unit 34 obtains a result of "normal operation", the information display unit 35 may display only such a result on the display device 27 of the user terminal 20, and then the operation of the application may be terminated. Alternatively, if the operation determining unit 34 obtains a result of "normal operation", the display unit 35 may display a front page of the instruction manual of the model on the screen of the user terminal 20, for example. For example, the user may scroll the screen of the user terminal 20 so as to access a page of the instruction manual that the user wants to read.

[Unevenness Emphasized Image]

Figure 7:
FIG. 7 is a diagram illustrating an example of an unevenness emphasized image.
Figure 8:
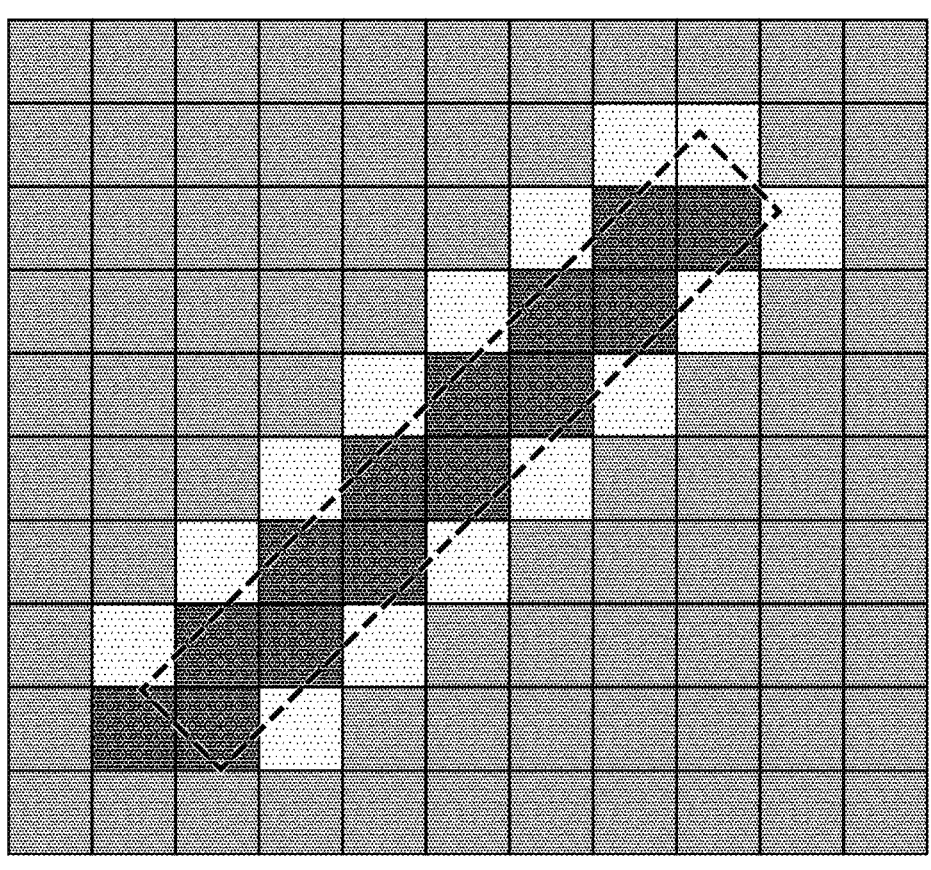
FIG. 8 is a diagram schematically illustrating a part of the unevenness emphasized image.

Referring to FIGS. 7 and 8, an unevenness emphasized image generated by the unevenness emphasized image generating unit 33 will be described. FIG. 7 is a diagram illustrating an example of an unevenness emphasized image. FIG. 8 is a diagram schematically illustrating a part of the unevenness emphasized image. In FIG. 8, a grid-like section represents one pixel. Further, in FIG. 8, light-colored sections indicate pixels having a low luminance, and dark-colored sections indicate pixels having a high luminance.

The actual image obtaining unit 31 obtains an actual image corresponding to the color of the actual object as the capturing target. For example, if the color of the dial and the color of the hand of the electronic timepiece as the capturing target are the same, the color of the dial and the color of the hand displayed in the actual image are also the same. As such, if the color of the dial and the color of the hand are similar to each other, it is difficult for the operation determining unit 34 to recognize the hand and to determine the operation of the hand. Preferably, the color of the dial is different from the color of the hand, but in this case, the flexibility in design is reduced. As such, the first embodiment employs the configuration for allowing the operation determining unit 34 to accurately determine the operation state of the hand without impairing the flexibility in design.

Specifically, as described above, the configuration is provided such that the unevenness emphasized image generating unit 33 of the user terminal 20 generates an unevenness emphasized image based on the actual image obtained by the actual image obtaining unit 31.

The unevenness emphasized image is an image in which information on the colors of respective pixels of the actual image is eliminated and the respective pixels represent the colors corresponding to heights of respective parts in the normal direction of the dial. In the first embodiment, the unevenness emphasized image represents a color difference corresponding to a difference between the height of the dial and the height of the hand in the normal direction of the dial. For example, the unevenness emphasized image may be generated by using the fact that the degrees of reflection of external light varies in accordance with the difference between the height of the dial and the height of the hand.

Further, the unevenness emphasized image may emphasize a shadow around the hand so as to emphasize the hand. Specifically, external light is less likely to strike the periphery of the hand at the area higher than the dial in the normal direction, creating shadows and making it appear dark. The area where the shadow is formed is represented by pixels having a small luminance, and the hand is thereby displayed with more emphasis. For example, the unevenness emphasized image may be a known normal vector map.

For example, in the unevenness emphasized image, the operation determining unit 34 may recognize, as a hand, a portion where the pixels in the same color are aligned in a straight line over a predetermined length. Further, the operation determining unit 34 may recognize a portion surrounded by pixels having a low brightness as a hand, for example. In FIG. 8, the portion recognized as a hand by the operation determining unit 34 is indicated by dashed lines.

As described above, the operation state of the hand is determined based on the unevenness emphasized image in which the color of the actual electronic timepiece is eliminated and represented in accordance with the height of each part of the electronic timepiece. This improves the accuracy in determining the operation state of the hand. Further, the colors of the dial and the hand can be freely determined, and thus, the flexibility in design is not lost.

Conclusion

With the information display system S described above, the user can easily access information (information on the device) related to the operation of the electronic timepiece. Specifically, the user can access the corresponding part of the instruction manual of the electronic timepiece only by capturing the electronic timepiece of the user using the camera 25 mounted on the user terminal 20. In this manner, the user can access the corresponding part of the instruction manual of the electronic timepiece even if the paper instruction manual is lost or the model of the electronic timepiece of the user is unknown. An electronic timepiece with complicated functions tends to need a large number of instruction manual pages, and this may cause a difficulty for a user in searching for a corresponding part. In this regard, employing the information display system S of the first embodiment allows the user to easily access the part of the instruction manual that needs to be read in accordance with the operation state of the hand of the electronic timepiece. The first embodiment employs the configuration in which the operation state of the hand is determined based on the image eliminating the reflection image, thereby determining the operation state with high accuracy.

In the first embodiment, the example has been described in which the trained model 12a is used to determine the model of the electronic timepiece in order to improve the accuracy in determining the model, although this is an example and the model of the electronic timepiece may be determined by the image recognition without using the trained model 12a. Further, in the first embodiment, the example has been described in which the trained model 12a learns the reflection image as the supervisory image, although the present invention is not limited thereto and the trained model in which the reflection image is not learned may be used.

Further, in the first embodiment, the example has been described in which the operation state of the hand is determined based on the unevenness emphasized image, although the present invention is not limited thereto and the operation state of the hand may be determined based on the actual image on which the unevenness is emphasized.

In the first embodiment, the example has been described in which the functions such as model determination are implemented in the user terminal 20, although the present invention is not limited thereto and some of the functions shown in FIG. 4 may be executed in the server 10.

In the first embodiment, the example has been described in which the operation state of the second hand is determined as the hand, but the present invention is not limited thereto. For example, if an electronic timepiece without a second hand is a capturing target, an operation state of the minute hand may be determined. For example, the existence of the second hand may be determined based on the actual image obtained by the actual image obtaining unit 31, and if it is determined that there is no second hand, the processing for determining the operation state of the minute hand may be performed. In this case, for example, the operation determining unit 34 may determine the operation state of the minute hand based on the first actual image and the second actual image that is captured after one or more minutes have elapsed since the first actual image is captured. The information display unit 35 may display such information that the capturing time (capturing interval) becomes longer on the display device 27 of the user terminal 20. Alternatively, before the camera is activated (step S14 in FIG. 5), the user may previously input the information regarding whether the electronic timepiece to be captured has the second hand. When such information that the electronic timepiece as the capturing target does not have the second hand is entered by the user, the processing for determining the operation state of the minute hand may be performed.

If the electronic timepiece as the capturing target has a function connectable to the user terminal 20 by near-field communication using Bluetooth (registered trademark), for example, the information display unit 35 may display correspondence description information on the display device 27 of the user terminal 20 and information on whether the electronic timepiece is synchronized with the time of the user terminal 20. When the user selects to synchronize the time, the time of the electronic timepiece may be adjusted based on the current time of the user terminal 20. Alternatively, the time may be automatically adjusted without confirming whether the time is to be synchronized. After the time is adjusted, the information display unit 35 may display such information that the time has been adjusted on the display device 27 of the user terminal 20.

Wristwatches may have different model numbers depending on types of bands (e.g., arrangement of colors, pattern, shape, material) even if their main bodies have the same shape. As such, the supervisory images learned in the trained model 12a in advance may be labeled with models (model numbers) assigned based on the combination of the watch body and the band type. An image obtained by the actual image obtaining unit 31 may display at least a part of the band in addition to the watch body. The model determining unit 32 may determine the model of the electronic timepiece (information about the device) using the trained model 12a based on the actual image including the watch body and the band.

In the first embodiment, the electronic timepiece is taken as an example of a capturing target, although the present invention is not limited to this and any device including at least a hand driven on a dial is applicable. For example, a capturing target may be a water meter and a pressure meter including a hand driven on a dial. For example, in a case where the capturing target is a water meter, the user terminal 20 may determine a model of the water meter by the model determining unit 32 and an operation state of the hand by the operation determining unit 34. Based on the determination results, the user terminal 20 may display information about the handling of the water meter (e.g., how to read the meter) on the screen.

The information display device of the first embodiment described above may include an actual image obtaining unit for obtaining an actual image of a device including a hand driven on a dial, a model determining unit for determining a type of the device based on the actual image, an operation determining unit for determining an operation state of the hand based on the actual image, and an information display unit for displaying information on the type of the device and a handling of the device according to the operation state.

The model determining unit may determine the type of the device by using a trained model trained by the learning data including the actual image in which the device captured in advance is displayed.

The trained model may have learned the learning data including an actual image of the device where the external light is reflected on the surface of the transparent cover of the hand captured in advance is displayed, and the model determining unit may determine whether the external light is reflected on the surface of the transparent cover using the trained model.

If the model determining unit determines that the external light is reflected on the transparent cover, the information display device may further include a notification unit that prompts the user to obtain an actual image again by the actual image obtaining unit.

The information display device may include text data as information related to handling of the device, and the information display unit may partially display a corresponding portion of the text data in accordance with the operation state of the hand.

The operation determining unit may determine the operation state by comparing the time indicated by the hand of the device displayed in the actual image with the current time measured by the clocking unit.

The actual image may include a first actual image and a second actual image captured after a predetermined period of time has elapsed since the first actual image is captured, and the operation determining unit may determine the operation state by comparing the first actual image with the second actual image.

The information display device may include the unevenness emphasized image generating unit that generates an unevenness emphasized image representing a color difference according to a difference between the height of the dial and the height of the hand in the normal direction of the dial based on the actual image, and the operation determining unit may determine an operation state of the hand based on the unevenness emphasized image.

An information display method of the first embodiment may include steps of obtaining an actual image on which a device including a hand driven on a dial is displayed, determining a type of the device based on the actual image, determining an operation state of the hand based on the actual image, and displaying information regarding a handling of the device according to the type of the device and the operation state.

A program of the first embodiment may cause a computer to execute processing of obtaining an actual image on which a device including a hand driven on a dial is displayed, determining a type of the device based on the actual image, determining an operation state of the hand based on the actual image, and displaying information on a handling of the device according to the type of the device and the operation state.

Second Embodiment

Figure 9:
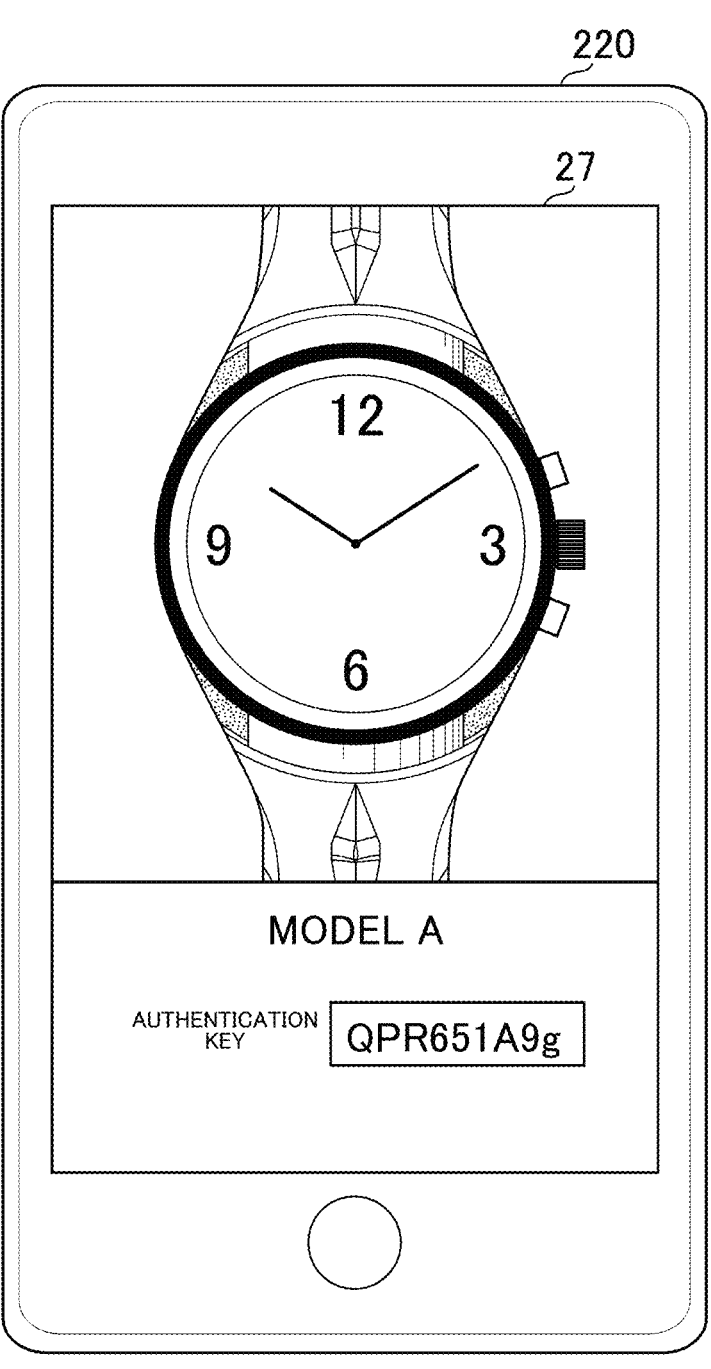
FIG. 9 is a diagram illustrating an example of an image displayed on the display device of the user terminal of the second embodiment.

Next, referring to FIG. 9, the second embodiment will be described. FIG. 9 is a diagram illustrating an example of an image displayed on the display device of the user terminal of the second embodiment.

In the first embodiment described above, the example has been described in which the instruction manual according to the model and the operation state of the electronic timepiece is displayed on the display device 27, but the information relating to the device displayed on the display device 27 is not limited thereto. Further, the present invention is not limited to displaying information on the device according to the model and the operation state of the electronic timepiece, and may display information on the device according to only the model of the electronic timepiece.

In the second embodiment, an example will be described in which guidance information about service according to the model of the electronic timepiece is displayed. The user terminal 220 of the second embodiment may not include the operation determining unit 34 described in the first embodiment. In the second embodiment, elements having the same functions as those described in the first embodiment are denoted by the same reference signs, and the explanation thereof is omitted.

FIG. 9 shows an example in which "model A" indicating the model of the captured electronic timepiece and a predetermined authentication key, which is guidance information, are displayed on the display device 27 of the user terminal 220. The authentication key may be information to be used to receive service corresponding to the model of the electronic timepiece. For example, a user of an electronic timepiece may enter an authorization key at a particular web site to obtain an image that is published exclusively to the user who owns the electronic timepiece. The image to be issued may be, for example, an illustration that can be transmitted instead of characters when users talk with each other by chatting. Further, the displayed guidance information is not limited to the authentication key, and may be a URL (Uniform Resource Locator) of a website where images issued exclusively to the user who owns the electronic timepiece can be obtained. The owner of the electronic timepiece may then access the website to obtain the images to be published exclusively to the owner of the electronic timepiece.

In the second embodiment as well, similarly to the first embodiment, when the model determining unit 32 determines that the electronic timepiece displayed on the image obtained by the actual image obtaining unit 31 is a reflection image, the notification unit 36 may prompt the user to capture an image again by the camera 25. The notification unit 36 may prompt the user to capture an image again by displaying characters to recapture an image on the display device 27 of the user terminal or by sound, for example. By capturing an image again, an image that is not a reflection image can be obtained. As such, in the second embodiment, it is possible to increase the accuracy of providing service according to the model of the electronic timepiece.

Third Embodiment

Figure 11:
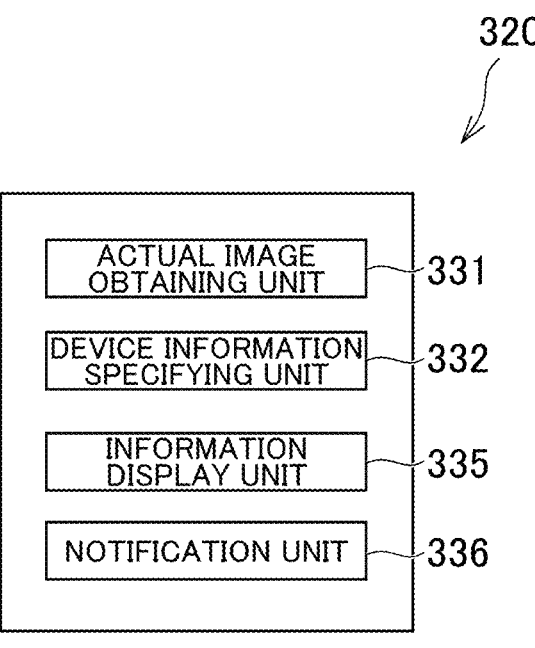
FIG. 11 is a functional block diagram showing an example of functions implemented in a user terminal of the third embodiment.
Figure 12:
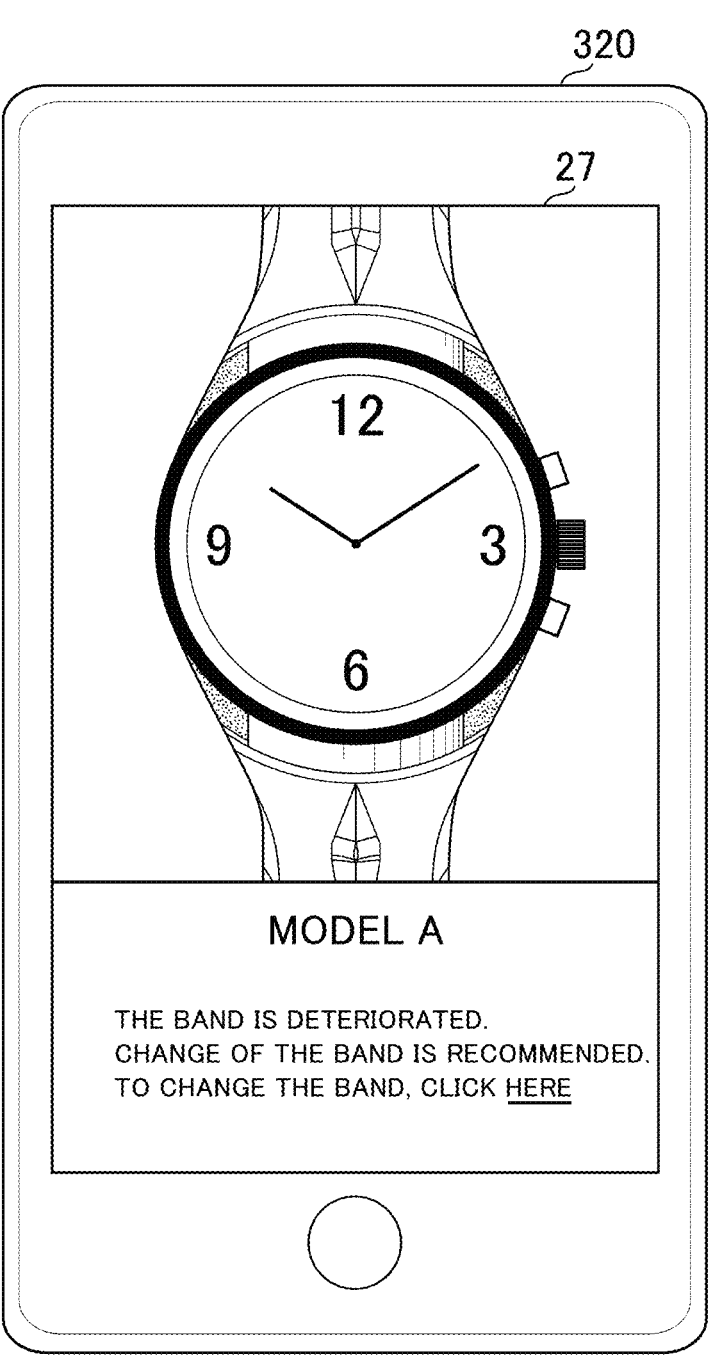
FIG. 12 is a diagram illustrating an example of an image displayed on the display device of the user terminal of the third embodiment.

Next, the third embodiment will be described referring to FIGS. 10 to 12. FIG. 10 is a diagram illustrating an overall configuration of an information display device according to the third embodiment. FIG. 11 is a functional block diagram showing an example of functions implemented in the user terminal of the third embodiment. FIG. 12 is a diagram illustrating an example of an image displayed on the display device of the user terminal of the third embodiment.

In the third embodiment, an example will be described in which the device information specifying unit 332 determines a deteriorated condition of the electronic timepiece, and the information display unit 335 displays the information on the deteriorated condition as the information on the device. In the third embodiment, elements having the same functions as those described in the first embodiment are denoted by the same reference signs, and the explanation thereof is omitted.

In the third embodiment, a server 310 is a server computer. The server 310 includes a control unit 311, a storage unit 312, and a communication unit 313.

The control unit 311 includes at least one processor. The control unit 311 executes processing in accordance with programs and data stored in the storage unit 312. The storage unit 312 includes a volatile memory, such as a RAM, and a non-volatile memory, such as a ROM, EEPROM, and a flash memory. In the third embodiment, the storage unit 312 stores at least a trained model 312*a* and a correspondence information table 312*b*. The communication unit 313 is a communication interface for wired or wireless communication, and performs data communication via the network N.

In the third embodiment, the trained model 312*a* is learning data including an actual image in which an electronic timepiece captured in advance is displayed, and is generated by machine learning of supervisory images that are labeled for respective deteriorated conditions of the model. The trained model 312*a* may be trained using a known machine learning algorithm, and may be features that are included in the supervisory images and automatically trained in each layer of the multi-layer neural network, for example.

In the third embodiment, the supervisory image displays the models 1, 2, . . . captured by randomly changing the capturing angle and the time indicated by the hands, for example, and includes images labeled for each model and each deteriorated condition of the model. The supervisory images respectively show electronic timepieces that are different in degrees of deterioration and the deteriorated portions. Specifically, the supervisory images may include, for example, an image of the model 1 without deterioration, an image of the model 1 with deterioration, an image of the model 2 without deterioration, and an image of the model 2 with deterioration.

The supervisory image includes a reflection image. The reflection image is an image of an electronic timepiece in which something in the vicinity of the electronic timepiece (e.g., a face of a user) is reflected on the surface of the transparent cover covering the hands driven on the dial due to the reflection of external light. In the third embodiment, regardless of the model and the deteriorated condition, the images displaying the electronic timepiece in which the reflection occurs may be labeled and used for the training.

The electronic timepiece displayed on the supervisory image is not limited to the electronic timepiece deteriorated over time due to use, but may be the electronic timepiece deteriorated due to an accelerated deterioration test, such as a temperature and humidity test and a light resistance test.

As shown in FIG. 11, the user terminal 320, which is an information display device of the third embodiment, includes an actual image obtaining unit 331, a device information specifying unit 332, an information display unit 335, and a notification unit 336. These units may be mainly implemented by the control unit 21 of the user terminal 320.

The actual image obtaining unit 331 obtains an actual image in which an electronic timepiece indicating time information (device indicating predetermined information) is displayed. The actual image is captured by the camera 25 and displayed on the display device 27 of the user terminal 320, and has not been subjected to special processing. In the third embodiment, the actual image obtaining unit 331 may obtain a still image.

The device information specifying unit 332 determines a model and a deteriorated condition of the electronic timepiece displayed in the actual image based on the actual image obtained by the actual image obtaining unit 331. In the third embodiment, the device information specifying unit 332 may use the technique of deep learning to determine which of the supervisory images trained in advance is closest to a given input image (actual image obtained by the actual image obtaining unit 331 in the third embodiment). The deteriorated condition may be determined based on color information of the actual image in which the electronic timepiece is displayed, for example. Specifically, in a case where brightness of the color of the leather band of the electronic timepiece displayed in the actual image is lowered due to color fading or peeling of the paint, the electronic timepiece may be determined as being in a deteriorated condition.

The trained model 312*a* may be transmitted from the server in response to a request from the user terminal 320 and temporarily stored in the storage unit 22 of the user terminal 320. The device information specifying unit 332 may determine the model and the deteriorated condition of the electronic timepiece using the trained model 12*a* stored in the storage unit 22.

The information display unit 335 displays the deterioration information determined by the device information specifying unit 332 on the display device. The notification unit 336 provides a predetermined notification in accordance with the determination result of the device information specifying unit 332. Specifically, when the device information specifying unit 332 determines that the image is a reflection image, the notification unit 336 may prompt the user to capture an image again by the cameras 25. With the configuration for determining whether the image is a reflection image, it is possible to prompt the user to capture an image and to increase the accuracy of determining the deteriorated condition. The notification unit 336 may prompt the user to capture the electronic timepiece again by displaying characters prompting the user to do so on the display device 27 of the user terminal or by sound, for example.

The correspondence information table 312*b* is a table in which a model and a deteriorated condition of an electronic timepiece are associated with information displayed when it is determined that the electronic timepiece is in the deteriorated condition. FIG. 12 shows an example of a screen in a case where it is determined that the electronic timepiece is a model A and the band is deteriorated. Further, FIG. 12 shows, as an example of information to be displayed when it is determined that the band is deteriorated, that the information display unit 335 displays access information to a store providing band exchange service. In the example of FIG. 12, the user clicks "here" in which the access information is embedded to access the shop information providing the exchange service of the band of the electronic timepiece of the user.

The information as shown in FIG. 12 is displayed, it is possible to prompt the user of the electronic timepiece to purchase a new band or change the band. The information displayed when it is determined that the electronic timepiece is in the deteriorated condition may be information on a cost of purchasing a new band or changing the band, for example.

Fourth Embodiment

Figure 13:
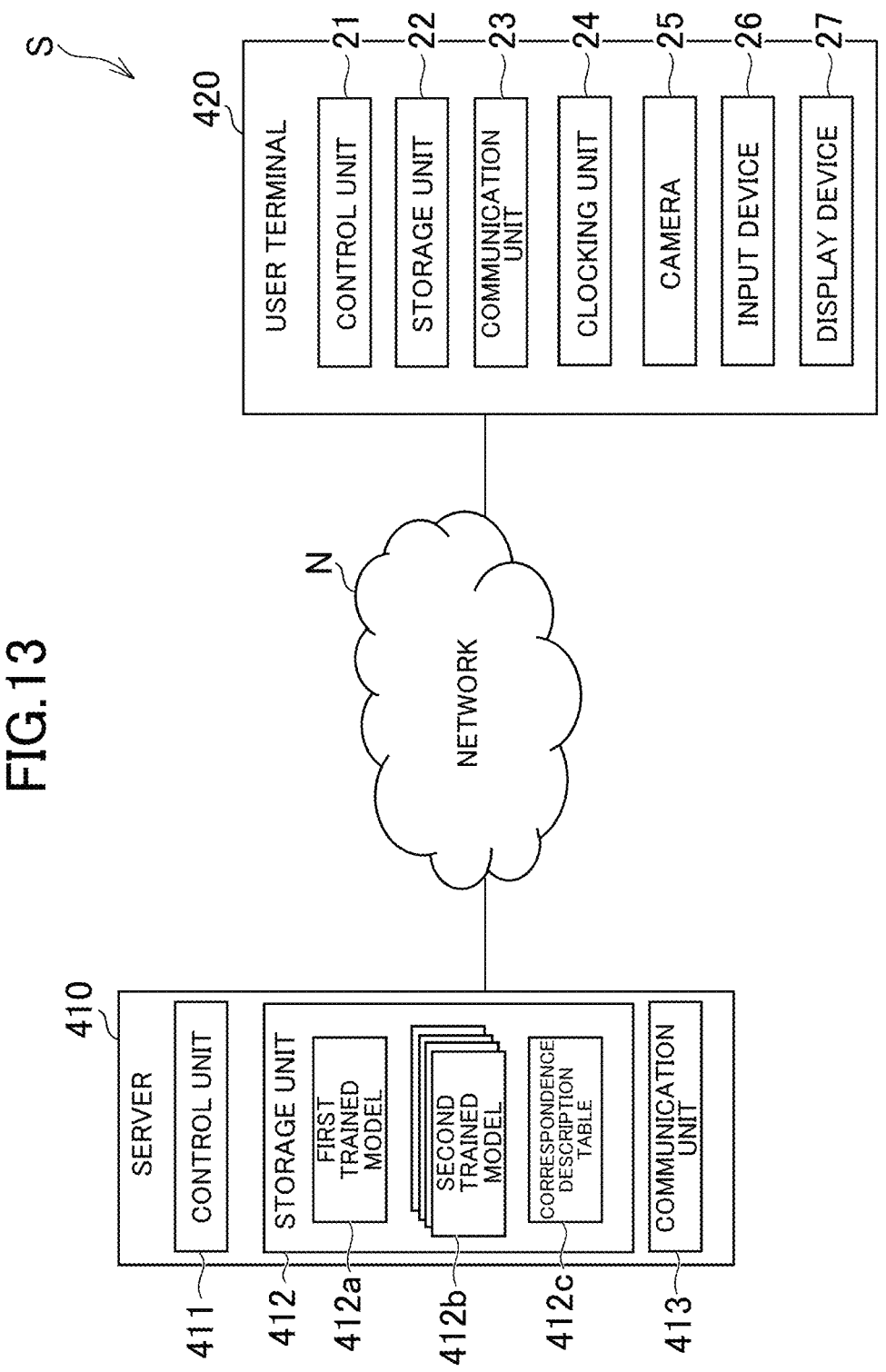
FIG. 13 is a diagram illustrating an overall configuration of an information display system according to the fourth embodiment.
Figure 14:
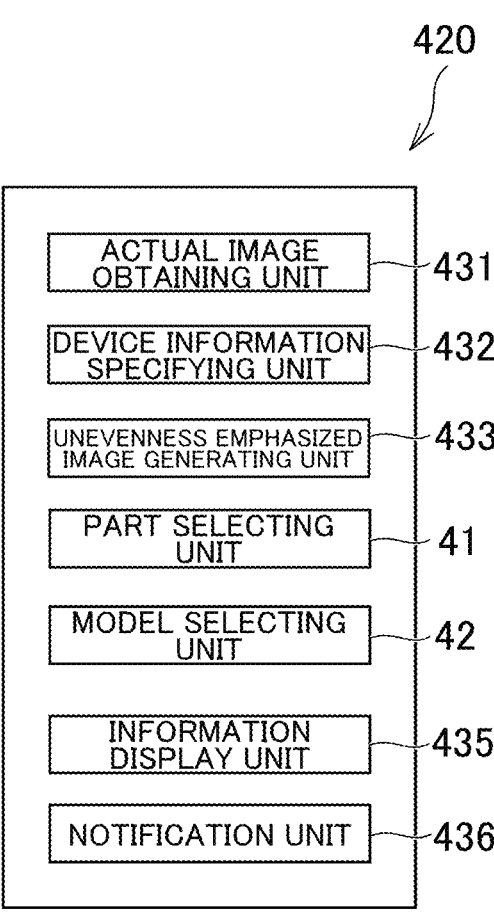
FIG. 14 is a functional block diagram showing an example of functions implemented in a user terminal of the fourth embodiment.
Figure 15:
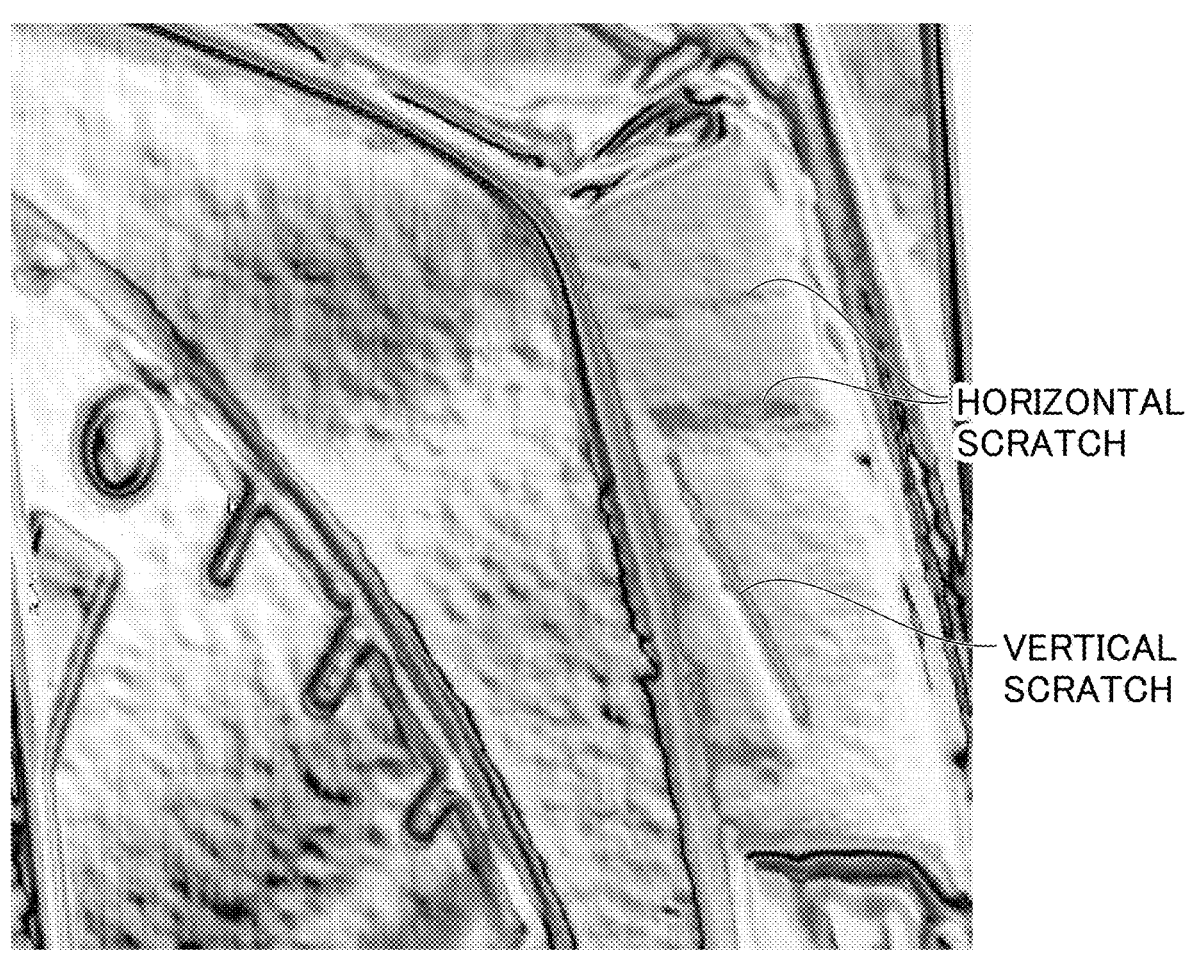
FIG. 15 is a diagram illustrating an example of an uneven emphasized image in which a part of an exterior case is displayed.
Figure 16:
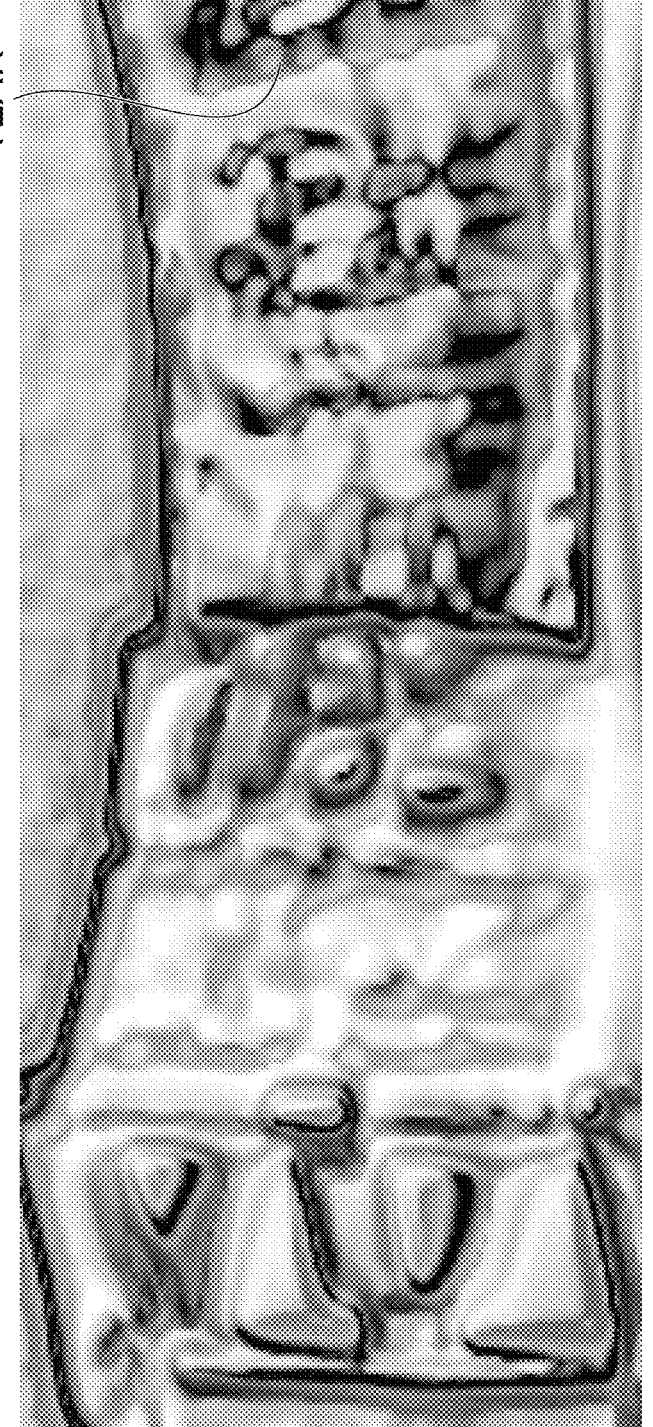
FIG. 16 is a diagram illustrating an example of an unevenness emphasized image in which a part of a leather band is displayed.

Next, referring to FIGS. 13 to 16, the fourth embodiment will be described. FIG. 13 is a diagram illustrating an overall configuration of an information display system according to the fourth embodiment. FIG. 14 is a functional block diagram showing an example of functions implemented in the user terminal of the fourth embodiment. FIG. 15 is a diagram illustrating an example of an uneven emphasized image in which a part of an exterior case is displayed. FIG. 16 is a diagram illustrating an example of an unevenness emphasized image in which a part of a leather band is displayed.

In the fourth embodiment, an example will be described in which the deteriorated condition of the electronic timepiece is determined based on the unevenness emphasized image to display information on the deteriorated condition. In the fourth embodiment, elements having the same functions as those described in the first embodiment are denoted by the same reference signs, and the explanation thereof is omitted.

The fourth embodiment is particularly useful when the deterioration of the electronic timepiece is caused by surface irregularities, such as scratches on the exterior case and tears of the leather band.

In the fourth embodiment, a server 410 is a server computer. The server 410 includes a control unit 411, a storage unit 412, and a communication unit 413.

The control unit 411 includes at least one processor. The control unit 411 executes processing in accordance with programs and data stored in the storage unit 412. The storage unit 412 includes a volatile memory, such as a RAM, and a non-volatile memory, such as a ROM, EEPROM, and a flash memory. In the fourth embodiment, the storage unit 412 stores at least a first trained model 412a, a plurality of second trained models 412b, and a correspondence information table 412c. The communication unit 413 is a communication interface for wired or wireless communication, and performs data communication via the network N.

The first trained model 412a is learning data including an actual image of an electronic timepiece captured in advance, and is generated when machine learning of a supervisory image labeled on each model is performed. The first trained model 412a may be trained using a known machine learning algorithm, and may be features that are included in the supervisory images and automatically trained in each layer of the multi-layer neural network, for example.

Each of the second trained models 412b is learned data that includes uneven emphasized images, in which electronic timepieces in a deteriorated condition captured in advance are displayed, and is generated by machine learning supervisory images labeled for each predetermined part of the electronic timepiece. The predetermined part may be, for example, a surface of the exterior case of the electronic timepiece viewed from the front side, a surface of the exterior case of the electronic timepiece viewed from the left side, a leather band attached to the upper part of the electronic timepiece, and a leather band attached to the lower part of the electronic timepiece.

As shown in FIG. 14, the user terminal 420, which is an information display device of the fourth embodiment, includes an actual image obtaining unit 431, a device information specifying unit 432, an unevenness emphasized image generating unit 433, a part selecting unit 41, a model selecting unit 42, an information display unit 435, and a notification unit 436. These units may be mainly implemented by control unit 21 of the user terminal 320.

The actual image obtaining unit 431 obtains an actual image in which an electronic timepiece indicating time information (device indicating predetermined information) is displayed. The actual image is captured by the camera 25 and displayed on the display device 27 of the user terminal 420, and has not been subjected to special processing. In the fourth embodiment, the actual image obtaining unit 431 may obtain a still image.

The device information specifying unit 432 determines a model of the electronic timepiece displayed in the actual image based on the actual image obtained by the actual image obtaining unit 431. In the fourth embodiment, the device information specifying unit 432 may use the technique of deep learning to determine which of the supervisory images trained in advance is closest to a given input image (here, an actual image obtained by the actual image obtaining unit 431).

The first trained model 412a may be transmitted from the server 410 in response to a request from the user terminal 420 and temporarily stored in the storage unit 22 of the user terminal 420. The device information specifying unit 432 may use the first trained model 412a stored in the storage unit 22 to determine a model of the electronic timepiece.

The part selecting unit 41 selects a part to be a target for determining a deteriorated condition. The part selecting unit 41 may select the part in accordance with an input operation of the user to the user terminal 420. For example, if the user wants to check the deteriorated condition of the leather band, the user may perform an input operation to the part selecting unit 41 to select the leather band.

After the part selecting unit 41 selects the part to be the target for determining the deteriorated condition, the user may adjust the target to be captured by the camera 25 to the part to be determined of the deteriorated condition. In this manner, the actual image obtaining unit 431 may obtain an actual image in which the target part for determining the deteriorated condition is displayed.

The model selecting unit 42 selects, from among the plurality of second trained models 412b, a second trained model 412b corresponding to the part of the electronic timepiece selected by the part selecting unit 41.

The unevenness emphasized image generating unit 433 generates an unevenness emphasized image based on the actual image in which the target portion for determining the deteriorated condition obtained by the actual image obtaining unit 431 is displayed. The unevenness emphasized image is generated by processing an actual image and represents a color difference corresponding to unevenness of the surface of the capturing target.

The device information specifying unit 432 determines a deteriorated condition of the part of the electronic timepiece, which is a capturing target, using the second trained model 412b selected by the model selecting unit 42 based on the unevenness emphasized image generated by the unevenness emphasized image generating unit 433. That is, the device information specifying unit 432 may determine the given input image (here, the unevenness emphasized image generated by the unevenness emphasized image generating unit 433) is most similar to which of the supervisory images learned in advance using the technique of deep learning.

The second trained model 412b may be transmitted from the server 410 in response to a request from the user terminal 420 and temporarily stored in the storage unit 22 of the user terminal 420. The device information specifying unit 432 may determine the deteriorated condition of the electronic timepiece using the second learned model 412b stored in the storage unit 22.

The information display unit 435 displays the deterioration information determined by the device information specifying unit 432 on the display device. The notification unit 436 provides a predetermined notification in accordance with the determination result of the device information specifying unit 432. Specifically, when the device information specifying unit 432 determines that the image is a reflection image, the notification unit 436 may prompt the user to capture an image again by the cameras 25. With the configuration for determining whether the image is a reflection image, it is possible to prompt the user to capture an image and to increase the accuracy of determining the deteriorated condition. The notification unit 436 may prompt the user to capture the electronic timepiece again by displaying characters prompting the user to do so on the display device 27 of the user terminal or by sound, for example.

The correspondence information table 412c is a table in which a part of an electronic timepiece is associated with information displayed when it is determined that the electronic timepiece is in the deteriorated condition. In the fourth embodiment, similarly to the third embodiment described with reference to FIG. 12, the display device 27 may display access information to the store providing the band exchange service, for example.

FIG. 15 is a diagram illustrating an example of an unevenness emphasized image of an exterior case in a deteriorated condition. In this example, the unevenness emphasized image represents a color difference corresponding to a difference between a portion where a vertical scratch and a horizontal scratch are formed on a surface of the exterior case and a height of a portion where the surface is flat in a normal direction of the exterior case.

The device information specifying unit 432 eliminates the color of the actual exterior case and determines a deteriorated condition based on the unevenness emphasized image represented in accordance with the height of the surface of the exterior case. This configuration enables the user to specify a scratch that is difficult to visually recognize is generated. That is, the deteriorated condition of the exterior case can be accurately determined.

FIG. 16 is a diagram illustrating an example of an unevenness emphasized image of a leather band in a deteriorated condition. In this example, the unevenness emphasized image represents a color difference corresponding to a difference between the height of the portion of the leather band where a tear occurs on the surface and the height of the portion of the leather band where no tear occurs in the normal direction of the leather band.

The device information specifying unit 432 eliminates the color of the actual leather band and determines a deteriorated condition based on the unevenness emphasized image represented in accordance with the height of the surface of the leather band. This configuration enables the user to specify a scratch that is difficult to visually specify is generated. That is, the deteriorated condition of the leather band can be accurately determined. Specifically, it is difficult to visually recognize whether it is a simple line or a tear in the leather band.

In the fourth embodiment, the examples of the deteriorated condition of the exterior case and the leather band are described, but the present invention is not limited thereto. For example, a deteriorated condition of a surface of a metal band may be determined.

In the first to fourth embodiments described above, the capturing target is an analogue wristwatch including hands, although the present invention is not limited thereto and may be a device that indicates time information, which is predetermined information, by at least either mechanical or electronic means. For example, the present invention may be applied to a digital wristwatch including a display unit that digitally displays time information, which is predetermined information.

Fifth Embodiment

Figure 17:
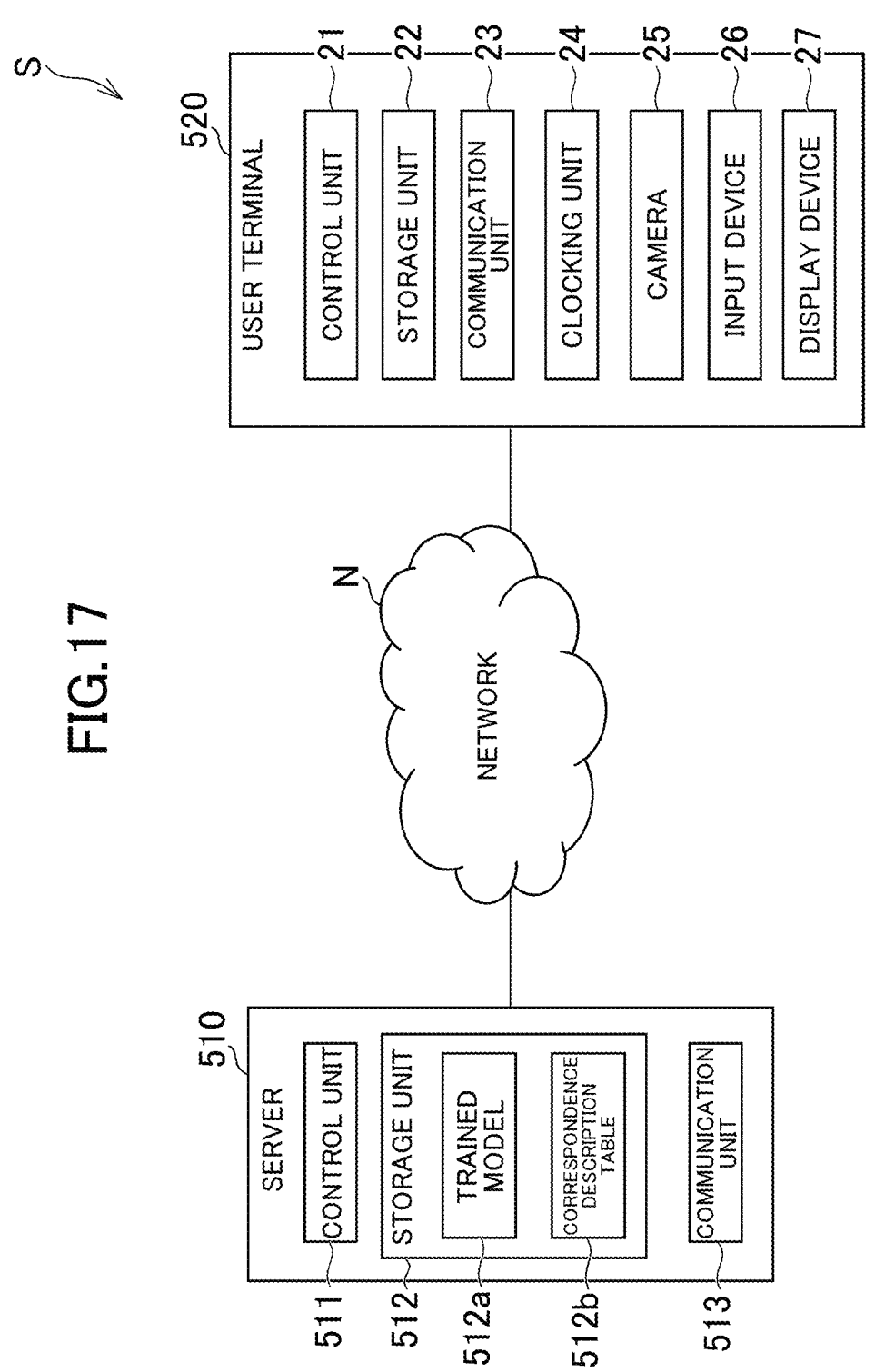
FIG. 17 is a diagram illustrating an overall configuration of an information display system according to the fifth embodiment.
Figure 18:
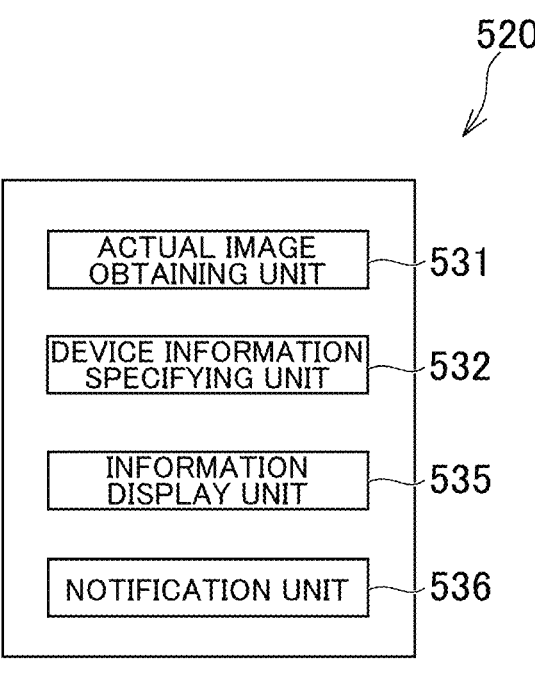
FIG. 18 is a functional block diagram showing an example of functions implemented in a user terminal of the fifth embodiment.

Next, referring to FIGS. 17 and 18, the fifth embodiment will be described. FIG. 17 is a diagram illustrating an overall configuration of an information display system according to the fifth embodiment. FIG. 18 is a functional block diagram showing an example of functions implemented in the user terminal of the fifth embodiment. In the fifth embodiment, elements having the same functions as those described in the first embodiment are denoted by the same reference signs, and the explanation thereof is omitted.

In the first to fourth embodiments above, the example has been described in which the actual image of a wristwatch is obtained to display various types of information, but the present invention is not limited thereto. In the fifth embodiment, a case will be described in which an actual image of an installed clock is obtained to display predetermined information. The installed clock is a device also called a clock stand, a clock tower, and a monument clock, for example. The installed clock may be a clock that is driven by electric power supplied from an external power source. The installed clock has a display unit indicating time information, and the display unit is fixed at a height of a structure, such as an outer wall or a pole provided in front of a station, inside a station, in a park, and in a commercial facility, or a structure such as a monument.

In the fifth embodiment, a server 510 is a server computer. The server 510 includes a control unit 511, a storage unit 512, and a communication unit 513.

The control unit 511 includes at least one processor. The control unit 511 executes processing in accordance with programs and data stored in the storage unit 512. The storage unit 512 includes a volatile memory, such as a RAM, and a non-volatile memory, such as a ROM, EEPROM, and a flash memory. In the fifth embodiment, the storage unit 512 stores at least a trained model 512a and a correspondence information table 512b. The communication unit 513 is a communication interface for wired or wireless communication, and performs data communication via the network N.

In the fifth embodiment, the trained model 512a is learning data including an actual image in which an installed clock captured in advance is displayed, and is generated by machine learning of supervisory images that are labeled for respective locations where the installed clocks are installed and capturing directions. The trained model 512a may be trained using a known machine learning algorithm, and may be features that are included in the supervisory images and automatically trained in each layer of the multi-layer neural network, for example. The installation location is a location where the installed clock is installed, and may be "in front of the north entrance of XX station" and "YY park", for example.

In the fifth embodiment, the supervisory images displaying installed clocks 1, 2, . . . are displayed and labeled for respective capturing directions of the installed clocks. The supervisory image may include a background of each installed clock. Specifically, the supervisory images may include an image of the installed clock 1 captured when facing in the northwest direction, an image of the installed clock 1 captured when facing in the southeast direction, an image of the installed clock 2 captured when facing in the north direction, and an image of the installed clock 2 captured when facing in the west-southwest direction, for example.

The supervisory images may include a halation image. Halation is a phenomenon in which a screen is blurred or dull due to too much light from backlight. Halation is likely to occur when capturing an object in the field, particularly when the weather is clear. A halation image is an image in which halation is occurred. In the fifth embodiment, regardless of the location of the installed clock and the capturing direction, it is preferable that images in which halation has occurred are commonly labeled and learned.

As shown in FIG. 18, the user terminal 520 of the fifth embodiment includes an actual image obtaining unit 531, a device information specifying unit 532, an information display unit 535, and a notification unit 536. The actual image obtaining unit 531 obtains an actual image in which an installed clock indicating time information (a device indicating predetermined information) is displayed. The actual image is captured by the camera 25 and displayed on the display device 27 of the user terminal 20, and has not been subjected to special processing.

The device information specifying unit 532 determines an installation location and a capturing direction of the installed clock using the trained model based on the actual image obtained by the actual image obtaining unit 531. In the fifth embodiment, the device information specifying unit 532 may use the technique of deep learning to determine which of the supervisory images trained in advance is most similar to a given input image (actual image obtained by the actual image obtaining unit 531 in the fifth embodiment).

The trained model 512a may be transmitted from the server in response to a request from the user terminal 520 and temporarily stored in the storage unit 22 of the user terminal 520. The device information specifying unit 532 may determine the installation location and the capturing direction of the installed clock by using the trained model 512a stored in the storage unit 22.

The correspondence information table 512b may be a table in which an installed clock and images displaying the installation location of the installed clock in the past are associated with each capturing direction. For example, when the user faces in the southwest direction and captures the installed clock by using the user terminal 20, the information display unit 535 may display an image of the installed clock and the scenery around the installed clock 50 years ago on the display device 27. This enables the user to see the scene 50 years ago viewed from the same viewpoint as the current capturing position. The information displayed is not limited to the image displaying the scene in the past, and may be any information related to the captured installed clock. The displayed information is not limited to a still image, and may be an animation such as a video image.

When the device information specifying unit 532 determines that the installed clock displayed in the image obtained by the actual image obtaining unit 531 is influenced by external light that inhibits identification of information about the installed clock, that is, when it is determined that the image is a halation image, the notification unit 536 prompts the user to capture the installed clock again using the camera. The user captures the installed clock again, thereby obtaining an image in which no halation is occurred. This serves to increase the accuracy of determining the installation location and the capturing direction of the installed clock. The notification unit 536 may prompt the user to capture the installed clock again by displaying characters prompting the user to do so on the display device 27 of the user terminal 20 or by sound, for example.

In the fifth embodiment, the installed clock preferably has a design feature on the dial on which the display unit indicating time information is provided and the surrounding of the dial. The dial may be fixed in a predetermined direction. This may vary the appearance of the dial and its surrounding depending on the direction in which the installed clock is viewed. That is, the design features of the installed clock may vary depending on the direction in which the installed clock is viewed. In the fifth embodiment, it is possible to benefit from the design features of the installed clock so as to accurately determine the installation location and the capturing direction of the installed clock and to display the information related to the installed clock.

In the fifth embodiment, the device information specifying unit 532 determines whether the image is a halation image using the trained model 512a, although the present invention is not limited thereto. For example, the device information specifying unit 532 may determine whether the image is a halation image based on the luminance of the pixels of the actual image. Specifically, the device information specifying unit 532 may determine whether the image is a halation image based on the mean value of RGB values of all the pixels of the actual image. If the mean value of the RGB values of all the pixels of the actual image is equal to or greater than a predetermined value, the device information specifying unit 532 may determine that the image is a halation image.

The invention claimed is:

1. An information display apparatus comprising:
   an actual image obtaining unit that obtains an actual image in which a device indicating predetermined information is displayed by at least either mechanical means or electronic means;
   an information specifying unit that specifies information about the device based on the actual image; and
   an information display unit that displays information about the device,
   wherein the information specifying unit determines whether the actual image is influenced by external light based on the actual image, the external light occurring when the actual image is obtained and inhibiting identification of the information about the device;
   wherein the information specifying unit determines a type of the device using a trained model that is trained by learning data including an actual image in which the device, captured in advance, is displayed;
   wherein the trained model has learned learning data including an actual image of the device that is captured in advance and influenced by the external light that inhibits the identification of the information about the device, and
   the information specifying unit uses the trained model to determine whether the device is influenced by the external light that inhibits the identification of the information about the device.

2. The information display apparatus according to claim 1 comprising a notification unit that provides a predetermined notification based on a determination result of the information specifying unit.

3. The information display apparatus according to claim 1, wherein
   the influence of the external light that inhibits the identification of the information about the device is light reflected on a surface of the device or halation due to backlight.

4. The information display apparatus according to claim 1, wherein the device includes a transparent cover that covers a display unit indicating the predetermined information, and
   the influence of the external light that inhibits the identification of the information about the device is light reflected on a surface of the transparent cover.

5. An information display apparatus comprising:
   an actual image obtaining unit that obtains an actual image in which a device indicating predetermined information is displayed by at least either mechanical means or electronic means;

an information specifying unit that specifies information about the device based on the actual image; and an information display unit that displays information about the device, wherein the information specifying unit determines whether the actual image is influenced by external light based on the actual image, the external light occurring when the actual image is obtained and inhibiting identification of the information about the device;

wherein the information specifying unit determines a type of the device using a trained model that is trained by learning data including an actual image in which the device, captured in advance, is displayed;

wherein the trained model has learned learning data including an actual image in which the device, in a deteriorated condition and captured in advance, is displayed, and the information specifying unit uses the trained model to determine whether the device is in the deteriorated condition.

6. An information display apparatus comprising:

an actual image obtaining unit that obtains an actual image in which a device indicating predetermined information is displayed by at least either mechanical means or electronic means;

an information specifying unit that specifies information about the device based on the actual image; and an information display unit that displays information about the device, wherein the information specifying unit determines whether the actual image is influenced by external light based on the actual image, the external light occurring when the actual image is obtained and inhibiting identification of the information about the device;

wherein the information display unit displays guidance information that is used to receive a service according to the type of the device specified by the information specifying unit.

7. The information display apparatus according to claim 1, further comprising an unevenness emphasized image generating unit that generates an unevenness emphasized image representing a color difference corresponding to a difference between a height of a predetermined part of the device in a normal direction of the predetermined part and a height of a part as a comparison target based on the actual image, wherein the information specifying unit specifies information about the device based on the unevenness emphasized image.

8. An information display apparatus comprising:

an actual image obtaining unit that obtains an actual image in which a device indicating predetermined information is displayed by at least either mechanical means or electronic means;

an information specifying unit that specifies information about the device based on the actual image; and an information display unit that displays information about the device, wherein the information specifying unit determines whether the actual image is influenced by external light based on the actual image, the external light occurring when the actual image is obtained and inhibiting identification of the information about the device;

wherein the device is an installed clock including a display unit that indicates time information and is fixed to a structure, and the information specifying unit uses a trained model, which is trained by learning data that includes an actual image of the installed clock, captured in advance, and is labeled for a location where the installed clock is located and each capturing direction in which the installed clock is captured, to determine the installation location and the capturing direction.

* * * * *